United States Patent [19]

Cruse

[11] 4,437,647

[45] Mar. 20, 1984

[54] QUICK CONNECT-DISCONNECT COUPLING FOR FLUID LINES

[75] Inventor: Lee H. Cruse, Ozark, Mo.

[73] Assignee: Foster Manufacturing Company, Springfield, Mo.

[21] Appl. No.: 385,858

[22] Filed: Jun. 7, 1982

Related U.S. Application Data

[63] Continuation-in-part of Ser. No. 104,307, Dec. 17, 1982, abandoned.

[51] Int. Cl.³ .............................................. C11D 7/00
[52] U.S. Cl. ................................ 251/149.9; 285/315; 285/DIG. 25
[58] Field of Search .................. 285/277, 315, 13, 14, 285/DIG. 1, DIG. 25; 251/89.5, 100, 149.9; 29/237; 137/614.06, 637.05

[56] References Cited

U.S. PATENT DOCUMENTS

| 2,736,578 | 2/1956 | Rafferty | 251/89.5 |
| 3,106,378 | 10/1963 | Hellstern | 251/149.9 |
| 3,106,379 | 10/1963 | Sciuto | 251/149.9 |
| 3,127,149 | 3/1964 | Cruse | 251/149.9 |
| 3,140,072 | 7/1964 | Sciuto | 285/315 |
| 3,589,673 | 6/1971 | Cruse | 251/149.9 |

*Primary Examiner*—Dave W. Arola
*Attorney, Agent, or Firm*—Rogers, Eilers & Howell

[57] ABSTRACT

A quick connect-disconnect coupling for fluid lines has a tubular socket as the female member thereof, has a sleeve which encircles and is movable relative to that socket, has a tubular plug as the male member thereof, and has interacting surfaces on that socket and sleeve which readily permit that sleeve to move successively from a plug-unlocking position through a plug-locking position to a fluid-on position. Those interacting surfaces automatically prevent accidental movement of that sleeve back from either that plug-locking position or that fluid-on position to that plug-unlocking position.

47 Claims, 16 Drawing Figures

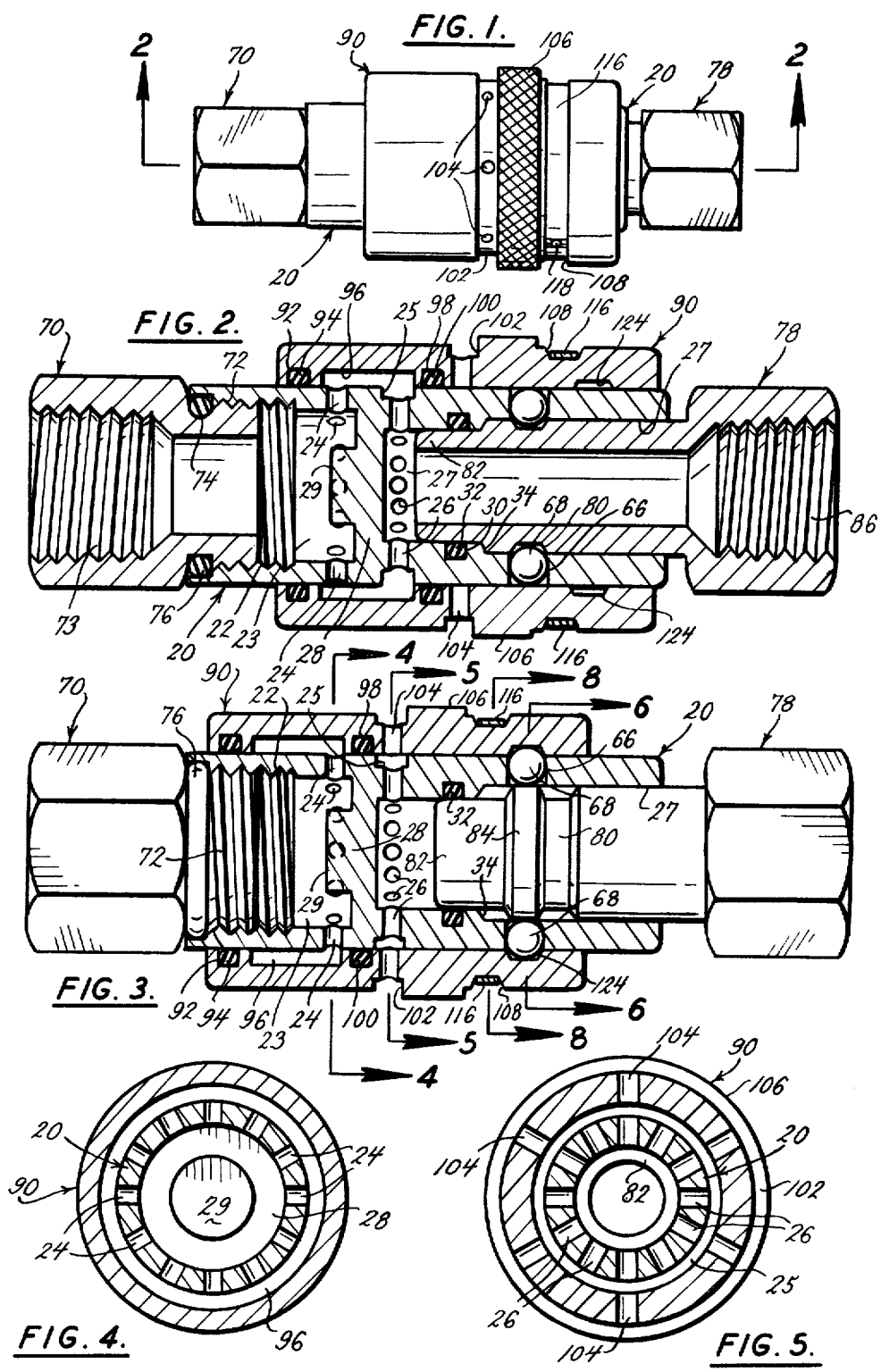

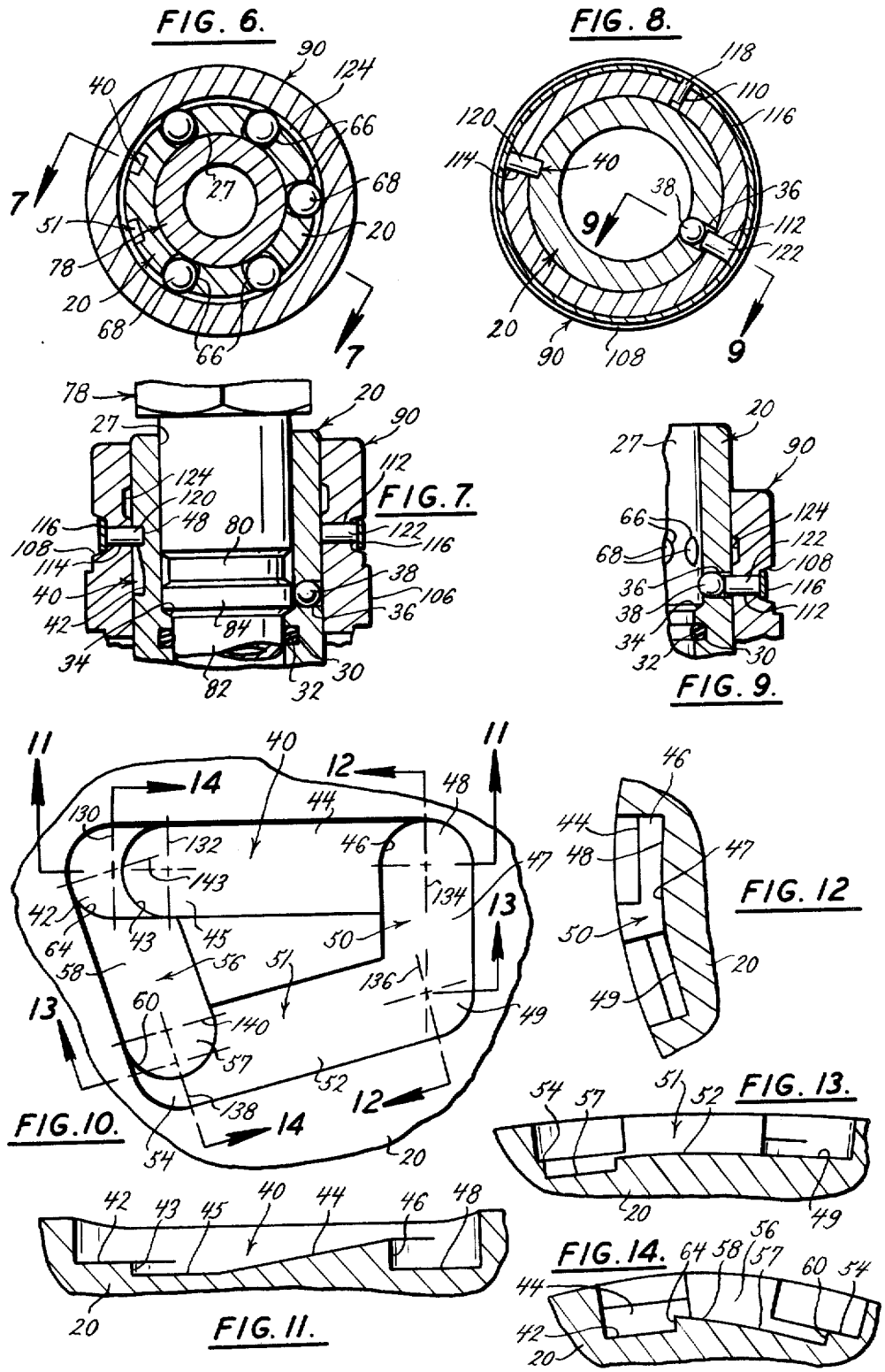

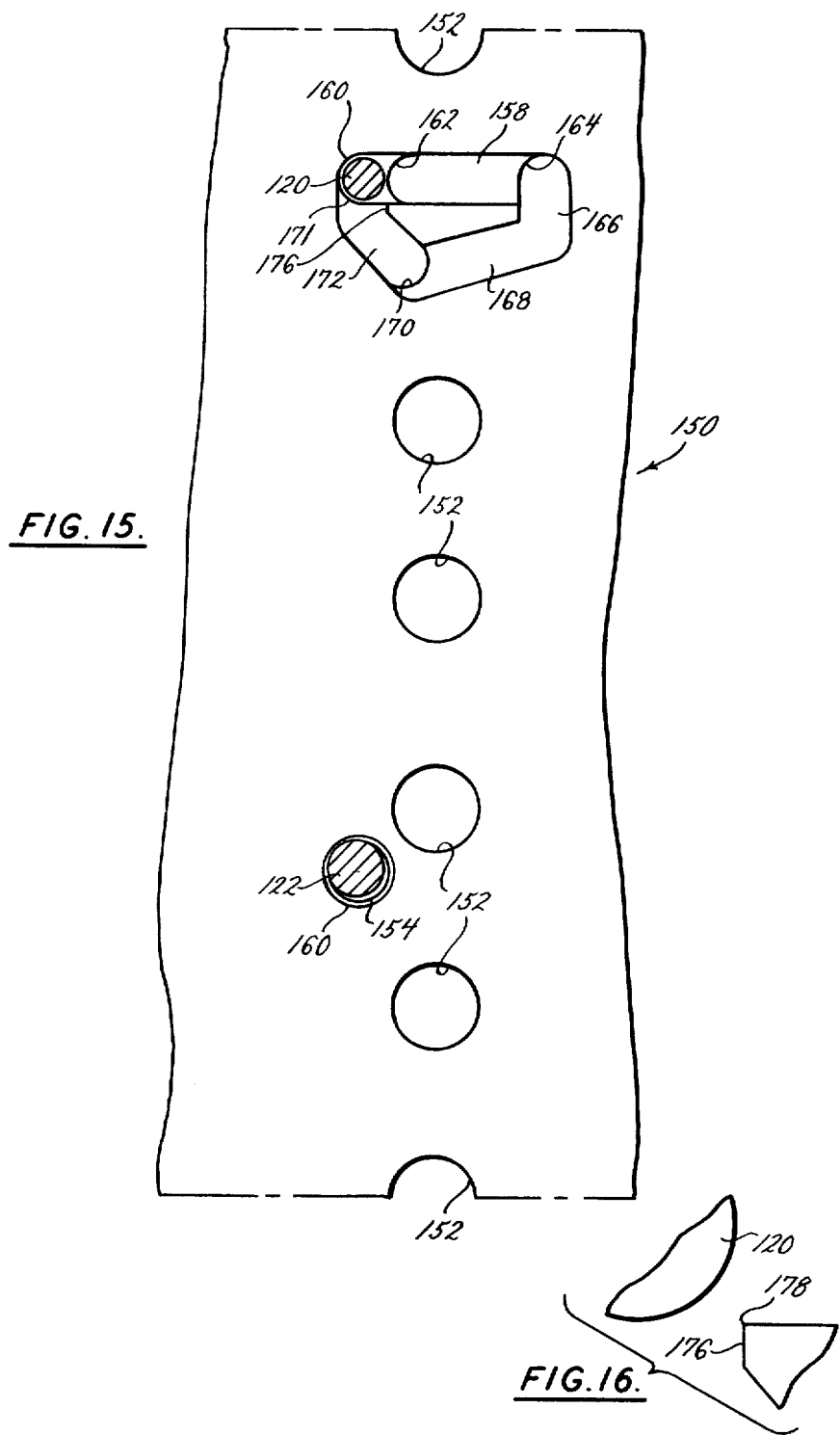

QUICK CONNECT-DISCONNECT COUPLING FOR FLUID LINES

CROSS-REFERENCE TO RELATED APPLICATION

This is a continuation-in-part of my co-pending application Ser. No. 104,307 for Quick Connect-Disconnect Coupling which was filed on Dec. 17, 1982 and is now abandoned.

BACKGROUND OF THE INVENTION

Quick connect-disconnect couplings for fluid lines have been known and used for many years. When used properly, those quick connect-disconnect couplings are very useful and desirable. However, if those quick connect-disconnect couplings were to be used carelessly or in a mischievous manner, they could injure the users thereof, could injure nearby persons, or could injure nearby objects.

SUMMARY OF THE INVENTION

A quick connect-disconnect coupling for fluid lines has a tubular socket as the female member thereof, has a sleeve which encircles and is movable relative to that socket, and has a tubular plug as the male member thereof. That sleeve can be disposed in a plug-unlocking position wherein that plug can easily be inserted into and removed from that socket, can be moved to a plug-locking position wherein that plug can not be removed from that socket, and can be moved to a fluid-on position wherein the coupling transmits pressurized fluid from one fluid line to another. Interacting surfaces on that sleeve and socket readily permit that sleeve to move from that plug-unlocking position through that plug-locking position to that fluid-on position, while automatically preventing accidental movement of that sleeve back from either that plug-locking position or that fluid-on position to that plug-unlocking position. It is, therefore, an object of the present invention to provide a quick connect-disconnect coupling for fluid lines that has interacting surfaces on the sleeve and socket thereof which readily permit that sleeve to move from a plug-unlocking position through a plug-locking position to a fluid-on position, while automatically preventing accidental movement of that sleeve back from either that plug-locking position or that fluid-on position to that plug-unlocking position.

The interacting surfaces provided by the present invention include a stop-equipped groove and a guiding pin which is disposed within that groove. That guiding pin can readily slide over the stops in that groove when that pin is moved in one direction relative to that groove; but it will be intercepted and held by those stops if an effort is made to move that pin in the opposite direction relative to that groove. The guiding pin will move in the one direction as the sleeve is moved from the plug-unlocking position through the plug-locking position to the fluid-on position. By preventing movement of that guiding pin through the groove in the opposite direction, the present invention prevents accidental movement of that sleeve back from either the plug-locked position or the fluid-on position to the plug-unlocking position. It is, therefore, an object of the present invention to provide a quick connect-disconnect coupling for fluid lines which has a stop-equipped groove and a guiding pin which is disposed within that groove, and which permits that guiding pin to slide readily over stops in that groove when that pin is moved in one direction relative to that groove but will cause that pin to be intercepted and held by those stops if an effort is made to move that pin in the opposite direction relative to that groove.

The stop-equipped groove provided by the present invention has a starting-terminating location for the guiding pin; and that starting-terminating location is readily and unmistakably sensed by any person who moves the sleeve from a plug-locked position to that starting-terminating location. As that guiding pin is moved into that starting-terminating location, a circumferentially-spaced locking pin will move into register with a recess; and a spring will urge that locking pin into that recess to lock the sleeve and tubular socket against relative movement. That recess must be large enough to accommodate that locking pin in all possible positions of that locking pin when the guiding pin is in the starting-terminating location of the stop-equipped groove; and yet the spacing between that recess and the closest recess for a plug-locking ball must be great enough to provide adequate wall thickness for that recess for that plug-locking ball. It is, therefore, an object of the present invention to provide a stop-equipped groove with a readily and unmistakably sensed starting-terminating location for a guiding pin, and to provide a circumferentially-spaced recess which can receive a locking pin in all possible positions of that locking pin when the guiding pin is in the starting-terminating location of the stop-equipped groove, and yet provide spacing between that recess and the closest recess for a plug-locking ball which is great enough to provide adequate wall thickness for that recess for that plug-locking ball.

The stop-equipped groove has a "start" section which extends from the starting-terminating location, wherein the plug is unlocked and the fluid is off, to a plug-locked fluid-on position; and it has a "return" section which extends from a plug-locked fluid-off position to the starting-terminating location. In the preferred embodiment of the present invention, the initial part of the start section is straight, the last part of the return section is straight, and those parts subtend a right angle. The resulting "play" between the apex of that angle and the face of the guiding pin will, in all positions of that pin within the starting-terminating location, be so small that the locking pin will be accommodated by the recess therefor in all of those positions of the locking pin and yet there will be an adequate thickness for the wall between that recess and the closest recess for a plug-locking ball. Where the angle, which is subtended by the initial part of the start section and the last part of the return section, is seventy-five degrees or smaller; the "play" between the apex of that angle and the face of the guiding pin will, in all positions of that pin within the starting-terminating location, be greater than in all corresponding positions of that pin when the subtended angle is a right angle. This means that if the subtended angle is to be seventy-five degrees or smaller, the recess for the locking pin must be enlarged to such an extent that the wall thickness between that recess and the closest recess for a plug-locking ball must be seriously reduced or very close machining tolerances must be maintained for the guiding and locking pins, for the recesses in the sleeve which accommodate those pins, for the starting-terminating location in the stop-equipped groove, and for the recess in the plug for the locking pin. A failure to enlarge the recess for the locking pin or a failure to maintain very close machining tolerances might enable the locking pin to ride on the edge of, rather than to enter, the recess therefor as the guiding pin was moved to and through the starting-terminating location at a time when the plug was displaced from the socket. It is, therefore, an object of the present invention to provide a subtended angle, between the initial part of the start section and the last part of the return section of the stop-equipped groove, for the guiding pin of a quick connect-disconnect coupling for fluid lines, which is larger than seventy-five degrees.

If the last part, of the return section of the stop-equipped groove, between the last plug-locked fluid-off position and the starting-terminating location were to be linear, the subtended angle, between that last part and the initial part of the start section of that groove, would be substantially smaller than a right angle. By making that last part of the return section of the stop-equipped groove alinear, it is possible (a) to make the subtended angle, between that last part and the initial part of the start section close to a right angle—thereby reducing the "play", for the guiding pin in all positions in the starting-terminating location, to such small values that the recess for the locking pin will be large enough to accommodate that locking pin in all of those positions of the guiding pin and (b) to provide an adequate wall thickness between that recess and the closest recess for a plug-locking ball; even where only standard and usual machining tolerances are maintained during the machining of the guiding and locking pins, of the recesses in the sleeve which accommodate those pins, of the starting-terminating location in the stop-equipped groove, and of the recess in the plug for the locking pin. It is, therefore, an object of the present invention to provide an alinear return section, for the stop-equipped groove, between the last plug-locked fluid-off position and the starting-terminating location.

Other and further objects and advantages of the present invention should become apparent from an examination of the drawing and accompanying description.

In the drawing and accompanying description, a preferred embodiment of the present invention is shown and described, but it is to be understood that the drawing and accompanying description are for the purpose of illustration only and do not limit the invention and that the invention will be defined by the appended claims.

BRIEF DESCRIPTION OF THE DRAWING

In the drawing, FIG. 1 is a side elevational view of one preferred embodiment of quick connect-disconnect coupling for fluid lines that is made in accordance with the principles and teachings of the present invention, FIG. 2 is a sectional view, on a larger scale, through the coupling of FIG. 1, it is taken along the plane indicated by the line 2—2 in FIG. 1, and it shows the sleeve of that coupling in its plug-locking, fluid-on position, FIG. 3 is a partially-sectioned view, on the scale of FIG. 2, through the coupling of FIG. 1, it is taken along the plane indicated by the line 2—2 in FIG. 1, and it shows the sleeve of that coupling in its plug-unlocking position, FIG. 4 is another sectional view on the scale of FIG. 2, and it is taken along the plane indicated by the line 4—4 in FIG. 3, FIG. 5 is yet another sectional view on the scale of FIG. 2, and it is taken along the plane indicated by the line 5—5 in FIG. 3, FIG. 6 is a further sectional view on the scale of FIG. 2, and it is taken along the plane indicated by the line 6—6 in FIG. 3, FIG. 7 is a still further sectional view on the scale of FIG. 2, and it is taken along the broken plane indicated by the broken line 7—7 in FIG. 6, FIG. 8 is an additional sectional view on the scale of FIG. 2, and it is taken along the plane indicated by the line 8—8 in FIG. 3, FIG. 9 is another additional sectional view on the scale of FIG. 2, and it is taken along the plane indicated by the line 9—9 in FIG. 8, FIG. 10 is a plan view, on a much larger scale, of pin-receiving grooves in the outer surface of the socket of the coupling of FIG. 1, FIG. 11 is a sectional view, on the scale of FIG. 10, and it is taken along the plane indicated by the line 11—11 in FIG. 10, FIG. 12 is another sectional view on the scale of FIG. 10, and it is taken along the broken plane indicated by the broken line 12—12 in FIG. 10, FIG. 13 is yet another sectional view on the scale of FIG. 10, and it is taken along the broken plane indicated by the broken line 13—13 in FIG. 10, FIG. 14 is a further sectional view on the scale of FIG. 10, and it is taken along the broken plane indicated by the broken line 14—14 in FIG. 10, FIG. 15 is a developed view of part of the outer surface of the tubular socket of a second preferred embodiment of quick connect-disconnect coupling for fluid lines that is made in accordance with the principles and teachings of the present invention, and FIG. 16 is a view, on a much larger scale, of the apex of the angle which is subtended by the initial part of the start section and the last part of the return section of a stop-equipped groove in the surface of the socket shown by FIG. 15.

DETAILED DESCRIPTION OF PREFERRED EMBODIMENTS

Embodiment of FIGS. 1–14

Referring to the drawing in detail, the numeral 20 generally denotes a tubular socket which constitutes the female member of one preferred embodiment of quick connect-disconnect coupling for fluid lines. An internal thread 22 is provided at the left-hand end of that socket; and that internal thread constitutes part of the inner surface of a cavity 23 which extends inwardly from the left-hand end of that socket and which has the inner end thereof defined by a partition 28. A cylindrical boss 29 extends into that cavity from the left-hand face of that partition, as shown particularly by FIGS. 2 and 3. A number of radially-directed ports 24 are formed in the wall of cavity 23 adjacent the inner end of that cavity.

The numeral 27 denotes a cavity which is coaxial with the cavity 23 but which is separated from that cavity by the partition 28. The cavity 27 extends to the right-hand end of the socket 20, as shown by FIGS. 2 and 3. The numeral 25 denotes an annular groove in the exterior of the socket 20; and that groove is disposed to the right of the partition 28, as shown by FIGS. 2 and 3. A number of radially-directed ports 26 extend through the wall of cavity 27 to place the groove 25 in communication with that cavity. The partition 28 prevents direct communication between the cavities 23 and 27.

The numeral 30 denotes an annular groove in the inner surface of the cavity 27; and that groove is disposed to the right of the ports 26. An O-ring 32 is disposed within that annular groove; and the diameter of a transverse section of that O-ring is greater than the depth of the groove 30. As a result, the inner surface of that O-ring normally projects into the cavity 27.

An inclined annular shoulder 34 constitutes part of the inner surface of the cavity 27; and that shoulder is disposed to the right of the annular groove 30, as shown by FIGS. 2 and 3. That shoulder interconnects a large diameter, right-hand portion of cavity 27 with a small diameter, left-hand portion of that cavity. A radially-directed recess 36 is provided in the wall of socket 20; and that recess is disposed to the right of the inclined shoulder 34, as indicated by FIGS. 7 and 9. The inner end of that recess is smaller in cross section than the rest of that recess. A ball 38 is disposed within that recess; and it can have the inner end thereof extending inwardly of the cylindrical inner surface of the right-hand portion of cavity 27, as shown by FIGS. 8 and 9. However, the reduced diameter inner end of recess 36 will limit the extent to which that ball can move inwardly of that cylindrical inner surface. The diameter of the ball 38 is substantially equal to the wall thickness of the right-hand portion of cavity 27, as shown by FIG. 7.

The numeral 40 generally denotes a groove in the outer surface of the right-hand end of socket 20, as indicated by FIG. 7. That groove is shown particularly by FIGS. 10 and 11; and it is straight. That groove has a generally flat area 42 with a concave left-hand end, has a stop 43 which is concave and which defines the right-hand end of the area 42 and which extends radially inwardly of that area, has a generally flat area 45 which has the left-hand end thereof defined by the stop 43 and which is displaced radially inwardly of the area 42 by that stop, has a ramp 44 which extends to the right from the area 45 and which inclines outwardly relative to that area, has a stop 46 which defines the right-hand end of ramp 44 and which is concave and which extends radially inwardly relative to that ramp, and has a generally flat area 48 which has the left-hand end thereof defined by the stop 46 and which has a concave right-hand end and which is displaced radially inwardly of the ramp 44 by that stop. The numeral 50 generally denotes a groove which extends at right angles to the axis of generation of groove 40, as shown particularly by FIG. 10. The groove 50 is straight; and it includes the generally flat area 48 of groove 40, a generally flat area 49 which has a concave end, and an intervening ramp 47, as shown by FIG. 12. The numeral 51 generally denotes a groove which is inclined relative to, and which is spaced circumferentially from, the groove 40, as shown by FIG. 10. The groove 51 is straight; and it includes the generally flat area 49 of groove 50 and a ramp 52 which extends to the left from that area and which inclines outwardly relative to that area. The upper end of the ramp 52 is denoted by the numeral 54; and a generally U-shaped portion of one side of that end is machined away, as shown by FIGS. 10 and 13. The numeral 56 generally denotes a groove which is inclined to, and which is spaced axially from, the groove 50. The groove 56 is straight; and it includes the upper end 54 of ramp 52, a stop 60 which is concave and which defines one edge of the machined-away portion of the upper end 54 and which extends radially inwardly of that upper end, a generally flat area 57 which has one end thereof defined by the stop 60 and which is displaced radially inwardly of the upper end 54 by that stop, a ramp 58 which extends to the left from the generally flat area 57 and which inclines outwardly relative to that area, a stop 64 which defines the upper end of the ramp 58 and which is plano-concave and which extends radially inwardly of that ramp, and the generally flat area 42 of groove 40. The grooves 40, 50, 51 and 56 constitute a continuous pin-receiving groove; and hence they define a closed loop in the outer surface of the socket 20. As indicated particularly by FIG. 7, a guiding pin 120 is in register with the generally flat area 48 of groove 40 whenever the quick connect-disconnect coupling is in its normal plug-locked fluid-on position.

The numeral 66 denotes a plurality of radially-directed, circumferentially-spaced recesses in the wall of socket 20; and those recesses are disposed to the right of the socket 36, as indicated by FIG. 9. The inner ends of those recesses are smaller in cross section than the rest of those recesses. Balls 68 are disposed in those recesses; and they can have the inner ends thereof extending inwardly of the cylindrical inner surface of the right-hand portion of cavity 27, as shown by FIG. 2. However, the reduced diameter inner ends of recesses 66 will limit the extent to which the balls 68 can move inwardly of that cylindrical inner surface. The diameter of each ball 68 is greater than the wall thickness of the right-hand portion of cavity 27, as shown by FIGS. 2, 3 and 6. The socket 20 is made from a single piece of metal.

The numeral 70 generally denotes a supply fitting of standard and usual design; and that supply fitting has an external thread 72 which mates with the internal thread 22 of socket 20. An annular groove 74 is provided in the outer surface of the supply fitting 70 adjacent the left-hand end of the external thread 72. An internal thread 73 is provided at the left-hand end of that supply fitting; and that internal thread will receive the external thread of a hose barb, not shown, for a pressurized fluid such as compressed air. An O-ring 76 is disposed within the annular groove 74; and it will be compressed as the external thread 72 is rotated inwardly relative to the internal thread 22 of socket 20. That O-ring will provide an air-tight seal between the internal thread 22 and the external thread 72.

The numeral 78 generally denotes a tubular plug which constitutes the male member of the preferred embodiment of quick connect-disconnect coupling for fluid lines. The left-hand end of that plug is denoted by the numeral 82, and it is dimensioned to telescope within the small diameter left-hand portion of cavity 27 of socket 20, as shown by FIGS. 2 and 3. That left-hand end of that plug will expand the O-ring 32, which is disposed within the groove 30; and that O-ring will provide an air-tight seal between plug 78 and socket 20. An annular rib 84 which has inclined faces is disposed between, and helps define, the inner end 82 and an annular groove 80, as shown by FIGS. 2, 3 and 7. That groove is dimensioned to accommodate the inner portions of the balls 68. The left-hand inclined face of annular rib 84 will serve as an inclined plane to move the balls 68 outwardly to the positions shown by FIG. 3 as the plug 78 has the reduced-diameter left-hand end 82 thereof telescoped within the small diameter left-hand portion of the cavity 27. The right-hand inclined face of annular rib 84 will serve as an inclined plane to move the balls 68 outwardly to the positions shown by FIG. 3 as the plug 78 is moved to the right from the position of FIG. 2 to the position of FIG. 3. An internal thread 86 is provided adjacent the right-hand end of plug 78; and that thread will accommodate the external thread on a hose barb, not shown, for a pressurized fluid such as compressed air.

The numeral 90 generally denotes a sleeve which is dimensioned to telescope over, and to closely encircle, the outer surface of socket 20. An annular groove 92 is provided at the inner surface of that sleeve adjacent the left-hand end of that sleeve, as shown by FIGS. 2 and 3. An O-ring 94 is disposed within that groove; and that O-ring will be compressed, and hence will provide a fluid-tight seal between sleeve 90 and socket 20, whenever that sleeve is telescoped over that socket. An annular recess 96 is formed in the inner surface of sleeve 90 a short distance to the right of the annular groove 92; and that recess has an axial dimension which enables it to simultaneously communicate with ports 24 and annular recess 25, as indicated by FIG. 2. However, the axial dimension of annular recess 96 is short enough so that recess can be wholly displaced away from annular recess 25, as shown by FIG. 3. The numeral 98 denotes an annular groove which is formed in the inner surface of sleeve 90 and which is disposed a short distance to the right of annular recess 96. An O-ring 100 is disposed within the groove 98; and that O-ring will be compressed, and hence will provide a fluid-tight seal between sleeve 90 and socket 20, whenever that sleeve is telescoped over that socket. An annular groove 102 is provided in the external surface of the sleeve 90 at a point which is displaced a short distance to the right of the annular groove 98, as shown by FIGS. 2 and 3. A number of circumferentially-displaced, radially-directed holes 104 are provided in the sleeve 90; and the outer ends of those holes communicate with the annular groove 102, as shown by FIGS. 2 and 3.

An annular knurled surface 106 is provided at the exterior of the sleeve 90; and that knurled surface is disposed to the right of the external annular groove 102. That annular knurled surface helps the user of the quick connect-disconnect coupling to apply reciprocative and rotative forces to that sleeve. An annular groove 108 is formed in the outer surface of the sleeve 90 adjacent the right-hand end of the knurled portion 106. A recess 110 is provided in the sleeve 90; and the outer end of that recess communicates with the annular groove 108, as indicated by FIG. 8. A radially-directed hole 112 is provided in the sleeve 90; and the outer end of that hole communicates with the annular groove 108, as indicated by FIG. 8, and the inner end of that hole communicated with the interior of that sleeve. The axis of hole 112 is displaced ninety degrees from the axis of recess 110, as shown by FIG. 8. A further radially-directed hole 114 is provided in the sleeve 90; and the outer end of that hole communicates with the annular groove 108, as indicated by FIG. 8, and the inner end of that hole communicates with the interior of that sleeve. The axis of hole 114 is displaced one hundred and three degrees from the axis of recess 110 and is displaced one hundred and sixty-seven degrees from the axis of hole 112. As indicated by FIG. 8, the hole 112 can be set in register with the recess 36 in the wall of socket 20, and the hole 114 can be set in register with the groove 40 in that socket.

The numeral 116 denotes a split-ring spring which is disposed within the annular groove 108. A pin 118, which is pressed into the recess 110, is disposed between the ends of that spring to prevent circumferential shifting of that spring relative to the sleeve 90. The guiding pin 120 is held within the hole 114 by the spring 116; and the inner end of that pin will always be in one or the other of the grooves 40, 50, 51 and 56 that are in the outer surface of socket 20. The numeral 122 denotes a locking pin which always will have the middle portion thereof disposed within the hole 112. The inner end of that locking pin can extend into the recess 36 of socket 20, as shown by FIGS. 8 and 9; and, at such time, the outer end of that locking pin will be close to the bottom of annular groove 108. The inner end of that locking pin can be flush with the inner surface of sleeve 90, as shown by FIG. 7; and, at such time, the outer end of that locking pin will project outwardly of the bottom of groove 108.

The numeral 124 denotes an annular groove in the inner surface of sleeve 90; and that groove is displaced to the right of the external annular groove 108, as shown by FIGS. 2 and 3. The annular groove 124 is dimensioned to accommodate the outer portions of the balls 68 which are held within the recesses 66 of socket 20, as shown by FIGS. 3 and 6.

The quick connect-disconnect coupling for fluid lines, which is provided by the present invention, locks the sleeve 90 in fluid-off position and against movement relative to the socket 20 whenever the plug 78 is spaced away from that socket. As a result, a careless or mischievous person can not shift that sleeve from fluid-off to fluid-on position while the cavity 27 is open. In this way, that coupling keeps such a person from using that coupling to direct jets of pressurized fluid toward nearby persons or objects. Also, that coupling will keep a careless or mischievous person from shifting the sleeve 90 into fluid-on position, and then producing an explosive release of pressurized fluid by applying a sharp pull on one of the fluid lines to separate the plug 78 from the socket 20. Consequently, the quick connect-disconnect coupling for fluid lines, which is provided by the present invention, affords a high degree of safety for the user of that coupling, for all nearby persons, and for all nearby objects.

Specifically, the sleeve 90 is locked against movement relative to the socket 20 by the locking pin 122 and by the recess 36 whenever the plug 78 is spaced away from that socket, as indicated by FIGS. 8 and 9. At such time, the spring 116 will cause the inner end of that locking pin to move the ball 38 far enough inwardly of the recess 36 to enable that inner end to enter the outer end of that recess, and also will hold the guiding pin 120 within the generally flat area 42 of groove 40, as indicated by the center line which is denoted by the numeral 130 in FIG. 10. The inner end of locking pin 122 will coact with the outer end of recess 36 to prevent any axial or rotational movement of that sleeve relative to that socket. Also at such time, the annular recess 96 within the sleeve 90 will be displaced from the annular groove 25 and hence will be displaced from the ports 26. Although the supply fitting 70 will supply pressurized fluid to the cavity 23 in socket 20, and although the ports 24 will supply that pressurized fluid to the annular recess 96, that pressurized fluid will be unable to reach the cavity 27, because that recess is displaced from annular groove 25 and ports 26, as shown by FIG. 3. As a result, the pressurized fluid will be held within cavity 23 and recess 96 by the O-rings 76, 94 and 100. All of this means that as long as the plug 78 is spaced away from the socket 20, the sleeve 90 will be locked against movement away from the plug-unlocked fluid-off position of FIGS. 8 and 9. Consequently, a careless or mischievous person will not be able to use any part of the quick connect-disconnect coupling of the present invention to release pressurized jets of fluid when the plug 78 is spaced away from the socket 20.

Whenever the locking pin 122 is held in the position of FIGS. 8 and 9 by the spring 116, it will force the inner end of the ball 38 to move into the path of the left-hand inclined face of the annular rib 84 on the small diameter left-hand end 82 of plug 78. As a result, that inner end of that ball will be engaged, and will automatically be moved outwardly of the cavity 27, by that inclined face as that plug is telescoped into that cavity. The outward movement of the ball 38 will automatically force the inner end of the locking pin 122 to move outwardly of the recess 36; and will thereby automatically unlock the sleeve 90 for movement relative to the socket 20. At this time, the left-hand inclined face of the annular rib 84 will abut, and be held against further inward movement by, the inclined annular shoulder 34, as shown by FIG. 2; and, as long as that face continues to abut that shoulder, the outer face of that annular rib will continue to hold the ball 38 fully within the recess 36 and hence in position to keep the inner end of locking pin 122 from entering that recess. The annular groove 80 in the exterior of the plug 78 will be in register with the balls 68 in the recesses 66, and some of those balls may respond to the force of gravity to enter that annular recess. Importantly, those balls will not be forcibly held within that annular groove; and hence the quick connect-disconnect coupling for fluid lines of the present invention will be in the plug-unlocked fluid-off position. At such time, the center of the inner end of the guiding pin 120 will still be at the centerline which is denoted by the numeral 130 in FIG. 10.

To shift the sleeve 90 from its plug-unlocked fluid-off position to its plug-locked fluid-off position, the operator of the quick connect-disconnect coupling for fluid lines of the present invention need only shift that sleeve a short distance from the position of FIG. 3 toward the position of FIG. 2. That shifting will cause the center of the inner end of guiding pin 120 to move from the centerline 130 to the centerline 132 in FIG. 10, and also will cause the left-hand face of the annular groove 124 in that sleeve to force all of the balls 68 inwardly relative to the recesses 66 and into the annular groove 80 of the plug 78. As the center of the inner end of pin 120 reaches the centerline 132, the portion of the inner surface of sleeve 90 which is disposed to the left of the annular groove 124 will be holding the inner ends of the balls 68 within the annular recess 80, and the spring 116 will force the inner end of pin 120 inwardly relative to the stop 43 and into engagement with the generally flat area 45. Thereupon, the sleeve 90 will be holding the quick connect-disconnect coupling for fluid lines of the present invention in a plug-locked fluid-off position; and the stop 43 and the pin 120 will keep that sleeve from being moved back to the plug-unlocked fluid-off position indicated by the centerline 130.

If the sleeve 90 is shifted further toward the position of FIG. 2, the inner end of pin 120 will engage, and will be moved outwardly by, the ramp 44 in groove 40, and the right-hand end of the annular recess 96 in that sleeve will begin to move into register with the left-hand portion of the annular groove 25. Thereupon, pressurized fluid will flow from supply fitting 70 via cavity 23, ports 24, annular recess 96, annular groove 25, ports 26 and cavity 27 into the plug 78. The O-rings 76, 94, 100 and 32 will prevent any loss of that pressurized fluid. The spring 116 will yield to permit the guiding pin 120 to move outwardly as it is moved along the ramp 44, but that spring will provide increased restorative forces as it yields; and those increased restorative forces are desirable, because they will resist any accidental shift of sleeve 90 from the plug-locked fluid-off position indicated by the centerline 132 to the plug-locked fluid-on position of FIG. 3.

In some instances, it will be desirable to shift the sleeve 90 rapidly, as it is shifted from the plug-locked fluid-off position indicated by the centerline 132 to the plug-locked fluid-on position of FIG. 2; and that sleeve can be shifted from the former position to the latter position as rapidly as desired. If it ever became desirable to shift that sleeve back and forth between the plug-locked fluid-off position indicated by the centerline 132 and the plug-locked fluid-on position of FIG. 2, the ramp 44 and pin 120 would permit such shifting as long as that pin was not moved beyond the stop 46. Any and all shifting of the sleeve 90 axially of the socket 20 can be effected without any risk of the plug 78 becoming separated from that socket 20; because the stop 43 and the pin 120 will keep that sleeve from shifting back into the plug-unlocked fluid-off position indicated by centerline 130. As a result, the user of the quick connect-disconnect coupling for fluid lines of the present invention could, if desired, shift the sleeve 90 to provide any desired fluid-off fluid-on transitions or fluid-on fluid-off transitions without any risk of having the plug 78 separate from the socket 20. Whenever the sleeve is shifted from plug-locked fluid-on position to the plug-locked fluid-off position indicated by the centerline 132, the ports 104 in that sleeve will be moved into register with the annular groove 25 of the socket 20; and, thereupon, the pressurized fluid within the cavity 27, the plug 78 and the fluid line connected to that plug will be vented to the atmosphere.

As the sleeve 90 is shifted into the plug-locked fluid-on position of FIG. 3, the center of the inner end of guiding pin 120 will move to the position indicated by the centerline 134; and, thereupon, the spring 116 will force the inner end of that guiding pin inwardly relative to the stop 46 and into engagement with the generally flat area 48. Thereafter, that sleeve will be unable to respond to mere axial shifting thereof to return to the plug-locked fluid-off position indicated by the centerline 132, much less to the plug-unlocked fluid-off position indicated by the centerline 130. Instead, that sleeve must be rotated in one direction relative to socket 20, must be shifted axially of that socket while rotating a further distance in that direction, and then must be rotated in the opposite direction while moving still further axially. Specifically, to return to the plug-unlocked fluid-off position indicated by the centerline 130, the sleeve must be rotated at right angles to the axis of the socket 20 to cause the inner end of the pin 120 to move from the plug-locked fluid-on position indicated by centerline 134 to a plug-locked fluid-on position indicated by a centerline 136. At that time, that inner end will engage the generally flat area 49 of groove 50. Thereafter, that sleeve must be shifted axially and also must be rotated even further to cause the inner end of the guiding pin 120 to move from the plug-locked fluid-on position indicated by centerline 136 to the plug-locked fluid-off position indicated by a centerline 138. At that time, that inner end will engage the upper end 54 of ramp 52. Subsequently, that sleeve must be rotated in the opposite direction while being shifted still further axially to move from the plug-locked fluid-off position indicated by centerline 138 through the plug-unlocking fluid-off position indicated by a centerline 140 to the plug-unlocked fluid-off position indicated by a centerline 143—which is the same plug-unlocked fluid-off position indicated by centerline 130.

In shifting from the position indicated by centerline 134 to the position indicated by centerline 136, the inner end of pin 120 experienced a slight outward movement; but it did not pass over any stops. In shifting from the position indicated by centerline 136 to the position indicated by centerline 138, the inner end of pin 120 experienced a further and larger movement as it moved along the ramp 52; but it did not pass over any stops. As a result, that guiding pin could be shifted back and forth between the position indicated by centerline 134 and the position indicated by centerline 138. Any shifting of the inner end of pin 120 between the position indicated by centerline 134 and the position indicated by the centerline 136 would not be significant, because both of those positions are plug-locked fluid-on positions. However, shifting of the inner end of pin 120 between the positions indicated by centerlines 136 and 138 would be significant because the position indicated by centerline 138 is a plug-locked fluid-off position whereas the position indicated by centerline 136 is a plug-locked fluid-on position. Consequently, shifting of the sleeve 90 to shift the inner end of pin 120 back and forth between the position indicated by centerline 136 and the position indicated by centerline 138 can enable the quick connect-disconnect coupling for fluid lines of the present invention to recurrently cut off and re-apply pressurized fluid to the fluid line attached to the plug 78. Whenever the sleeve is shifted from a plug-locked fluid-on position to the plug-locked fluid-off position indicated by the centerline 138, the ports 104 will be moved into register with the annular groove 25 of the socket 20; and, thereupon, the pressurized fluid within the cavity 27, the plug 78 and the fluid line connected to that plug will be vented to the atmosphere.

Any shifting of the inner end of the guiding pin 120 from the position indicated by centerline 138 to the position indicated by centerline 140 will be significant; because it will permit the spring 116 to force that inner end to move inwardly relative to the stop 60 and into engagement with the generally flat area 57. At this time, the left-hand edge of the annular groove 124 in the inner surface of the sleeve 90 will be disposed to the left of the right-hand edges of the recesses 66 in the socket 20 but will be disposed to the right of the left-hand edges of those recesses. The stop 60 will prevent any shifting of the inner end of pin 120 back to the position indicated by centerline 138, much less to either of the plug-locked fluid-on positions indicated by the centerlines 136 and 134. All of this means that once the inner end of the pin 120 has been moved to or past the position indicated by centerline 140, the quick connect-disconnect coupling of the present invention can not be used to supply pressurized fluid, to the plug 78 and its fluid line, until that guiding pin has been moved through the rest of groove 56 to the position indicated by centerline 143 and then moved through the groove 40 past the position indicated by centerline 132.

As the inner end of the guiding pin 120 is shifted from the position indicated by centerline 140 toward the position indicated by centerline 143, that inner end will engage, and be moved outwardly by, the ramp 58. As that inner end is moved into the position indicated by centerline 143, the spring 116 will force that inner end to move inwardly relative to the stop 64 and into engagement with the generally flat area 42. That stop will prevent shifting of that inner end back to the position indicated by centerline 140, and hence will prevent shifting of sleeve 90 back to the plug-unlocking fluid-off position indicated by centerline 140, much less to the plug-locked fluid-off position indicated by centerline 138 or either of the plug-locked fluid-on positions indicated by the centerlines 136 and 134.

As the inner end of the pin 120 moves to the position indicated by centerline 143, the inner end of the locking pin 122 will move into register with the recess 36 in socket 20; and the spring 116 will urge that inner end toward that recess. However, as long as the plug 78 is in the position of FIG. 2, the annular rib 84 on that plug will underlie the ball 38 and thereby keep it from moving inwardly of that recess. Because ball 38 will be kept from moving inwardly, the inner end of pin 122 will be kept from moving inwardly; and hence, although that locking pin will be in register with recess 36, that locking pin will not be able to move into that recess to interlock the sleeve 90 with the socket 20 until the plug 78 has the annular rib 84 therefor moved away from that recess. However, as soon as that plug is moved to the right from the position of FIG. 2, the spring 116 will force the inner end of the locking pin 122 into the recess 36 to interlock the sleeve 90 and socket 20 against any and all relative shifting or rotation.

The stops 43, 46, 60 and 64 are made arcuate to provide surface contact rather than mere line contact between those stops and the inner end of the guiding pin 120. That surface contact minimizes, and essentially eliminates, any likelihood that the upper edges of those stops could be battered and worn to such an extent that those stops could not perform the functions of stops.

When the inner end of the guiding pin 120 reaches the position indicated by centerline 138, the annular recess 96 will be displaced axially from the annular groove 25 and the ports 26. Thereupon, the pressurized fluid in cavity 27, plug 78 and in the fluid line attached to that plug will be vented to the atmosphere. Consequently, when the inner end of the pin 120 is subsequently moved along the groove 56 to a position where the plug 78 can be separated from the socket 20, there will be little or no pressurized fluid in cavity 27, plug 78 and in the fluid line attached to that plug. As a result, the separation of that plug and socket can be accomplished without any explosive release of pressurized fluid and without the application to that plug and socket of explosive releasing forces.

The angle which is subtended by the grooves 51 and 56 helps make certain that all of the pressurized fluid will have been vented to the atmosphere by the time the sleeve 90 has been shifted far enough to the left of the position of FIG. 2 to free the plug 78 for separation from socket 20. Specifically, that angle prevents straight-line movement of sleeve 78 from any plug-locked fluid-on position to a plug-unlocked fluid-off position. In addition, that angle forces the operator of the quick connect-disconnect coupling for fluid lines of the present invention to stop rotating that sleeve in the direction it was rotating, as the inner end of guiding pin 120 was being moved successively through grooves 50 and 51, and then cause that sleeve to start rotating in the opposite direction. In addition, that sleeve had to be shifted further in the same axial direction it was moving as the inner end of pin 120 was being moved through the groove 51. As a result, by the time the sleeve 90 has been rotated and shifted relative to socket 20 to cause the inner end of pin 120 to move beyond the position indicated by centerline 140, there will be little or no pressurized fluid in cavity 27, plug 78 and the fluid line attached to that plug.

The grooves 40, 50, 51 and 56 are contiguous, and hence they coact to constitute a closed loop. Such a closed loop makes certain that the sleeve 90 always starts its movement, after plug 78 has been telescoped into cavity 27, from a plug-locked fluid-off position wherein the inner end of the locking pin 122 is in register with the recess 36 in the socket 20. Moreover, such a closed loop makes certain that the sleeve 90 will be returned to that plug-locked fluid-off position when the inner end of guiding pin 120 has been moved successively through each of the grooves 40, 50, 51 and 56 and back into register with the generally flat area 42. As a result, locking of the sleeve 90 to the socket 20 by locking pin 122 and recess 36 is automatically assured whenever the plug 78 is separated from that socket.

The closed loop constituted by the grooves 40, 50, 51 and 56 also is desirable in forcing the operator, of the quick connect-disconnect coupling for fluid lines which is provided by the present invention, to rotate the sleeve 90 as well as shift that sleeve as he moves that sleeve from any plug-locked fluid-on position toward a plug-unlocked fluid-off position. The need of rotating, as well as shifting, that sleeve virtually eliminates any and all accidental separation of plug 78 from the socket 20. Further, the need of rotating, as well as shifting, that sleeve causes sufficient time to elapse, during the movement of that sleeve to plug-unlocked fluid-off position, to enable all or substantially all of the pressurized fluid in the cavity 27, in the plug 78, and in the fluid line attached to that plug to vent to the atmosphere. As a result, the present invention minimizes, and virtually eliminates, the likelihood of any pressure-induced separation of plug 78 from socket 20.

The inner end of the guiding pin 120 always extends into one or more of the grooves 40, 50, 51 and 56 of the closed loop which is constituted by those grooves. As a result, proper positioning of sleeve 90 relative to socket 20 always is assured. Further, because the spring 116 constantly urges the inner end of pin 120 inwardly of one or more of the grooves 40, 50, 51 and 56, that inner end will engage and be controlled by the various stops and ramps in those grooves.

The configurations which are shown for the grooves 40, 50, 51 and 56 are very desirable; but, if desired, those configurations could be changed. Specifically, the lengths of those grooves could be changed, the angular dispositions of those grooves could be changed, and one or more of those grooves could be made arcuate in plan. However, no matter how they are changed or modified, those grooves should prevent accidental shifting of the sleeve 90 from any plug-locked fluid-on position back to its initial plug-unlocked, fluid-off position.

If desired, the guiding pin 120 could be mounted so the inner end thereof could be momentarily moved outwardly at the option of the operator of the quick connect-disconnect coupling for fluid lines which is provided by the present invention. In such event, the closed loop provided by the grooves 40, 50, 51 and 56 could be replaced by a single groove. The spring 116 or some equivalent spring would urge the inner end of that pin into the groove 40; and that groove would perform the function which it performs in the preferred embodiment of the present invention. However, by actuation of a rocking lever, a cam, or some other mechanism, the operator of the quick connect-disconnect coupling for fluid lines could, whenever he wanted to shift the sleeve 90 from the plug-locked fluid-on position indicated by the centerline 134 back to the original plug-unlocked fluid-off position indicated by the centerline 130, momentarily cause the inner end of the guiding pin 120 to be raised upwardly out of the path of the stop 46. Thereafter, that operator could shift sleeve 90 axially back to the position wherein that guiding pin and the stop 43 would hold the center of the inner end of the guiding pin 120 coincident with the centerline 132. At such time, the compressed fluid in cavity 27 would vent to the atmosphere via ports 26, annular groove 25 and holes 104. A further actuation of that rocking lever, cam or other mechanism could raise the inner end of pin 120 upwardly out of the path of the stop 43; and thereby permit the operator to shift sleeve 90 axially back to the position wherein the center of that inner end was coincident with the centerline 130. Such an arrangement would not be as desirable as the plural-groove closed path in the preferred embodiment of the present invention; but it would prevent accidental movement of the sleeve 90 from any plug-locked, fluid-on position back to the original plug-unlocked fluid-off position.

The preferred embodiment of quick connect-disconnect coupling for fluid lines, which is shown and described in FIGS. 1-14 can be made in different sizes. For example, that coupling could be made with sockets 20 that had outer diameters of six hundred and thirteen thousandths (0.613) of an inch, of eight hundred and fifteen thousandths (0.815) of an inch, of nine hundred and thirty-five thousandths (0.935) of an inch, and of one and one hundred and eighty-two thousandths (1.182) of an inch. Where the socket 20 has an outer diameter of six hundred and thirteen thousandths (0.613) of an inch, the distance between the centerlines 130 and 132 is fifty-nine thousandths (0.059) of an inch, the distance between the centerlines 132 and 134 is two hundred and seven thousandths (0.207) of an inch, the distance between the intersection of centerline 134 and the axes of generation of grooves 40 and 50 and the intersection of centerline 136 and the axes of generation of grooves 50 and 51 is one hundred and twenty-five thousandths (0.125) of an inch, the distance between the centerlines 136 and 138 is two hundred and twelve thousandths (0.212) of an inch, the distance between the centerline 140 and the intersection between centerline 138 and the axes of generation of grooves 51 and 56 is twenty-three thousandths (0.023) of an inch, and the distance between the centerlines 140 and 143 is one hundred and fifty-eight thousandths (0.158) of an inch. The generally flat areas 42, 45, 48, 49 and 57 are spaced inwardly of the outer surface of socket 20 the following distances:

| Generally Flat Areas | Distances by Which Areas Are Spaced Inwardly of Outer Surface of Socket 20 |
| --- | --- |
| 42 | thirty-seven thousandths (0.037) of an inch |
| 45 | fifty-two thousandths (0.052) of an inch |
| 48 | fifty-two thousandths (0.052) of an inch |
| 49 | forty-two thousandths (0.042) |

-continued

| Generally Flat Areas | Distances by Which Areas Are Spaced Inwardly of Outer Surface of Socket 20 |
|---|---|
| 57 | thirty-seven thousandths (0.037) of an inch |

The rises provided by the ramps 44, 47, 52 and 58 are as follows:

| Ramp | Rise |
|---|---|
| 44 | thirty thousandths (0.030) of an inch |
| 47 | ten thousandths (0.010) of an inch |
| 52 | twenty thousandths (0.020) of an inch |
| 58 | fifteen thousandths (0.015) of an inch |

Each of the grooves 40, 50, 51 and 56 is ninety-three thousandths (0.093) of an inch wide.

Embodiment of FIGS. 15 and 16

Referring particularly to FIGS. 15 and 16, the numeral 150 generally denotes a tubular socket which is very similar to the tubular socket 20 of FIGS. 1-14; but FIG. 15 is a developed view of the outer surface of the tubular socket 150. That tubular socket has an internal thread, not shown, at the left-hand end thereof, has a cavity which extends inwardly from the left-hand end thereof, and has a partition with a cylindrical boss thereon; and that internal thread, cavity, partition and boss preferably will be identical to the internal thread 22, cavity 23, partition 28, and boss 29 of tubular socket 20. The tubular socket 150 also has two sets of radially-directed ports, a cavity which extends inwardly from the right-hand end thereof, and an annular groove in the exterior thereof; and those ports, that cavity, and that groove preferably are identical to the ports 24 and 26, the cavity 27 and the annular groove 25 of tubular socket 20. Further, the tubular socket 150 has an annular groove and an inclined annular shoulder; and that annular groove and that annular shoulder preferably are identical to the groove 30 and shoulder 34 of tubular socket 20.

The numeral 152 denotes recesses for plug-locking balls; and those recesses preferably will be identical to the recesses 66 of tubular socket 20, and they will accommodate plug-locking balls that preferably are identical to the locking balls 68. The numeral 154 denotes a recess which is similar to the recess 36 in tubular socket 20. Both of those recesses have larger-diameter outer ends to receive the inner ends of locking pins 122; but only the recess 154 is shown on a scale which permits the larger-diameter outer end 156 thereof to be seen. The small-diameter portions of recesses 36 and 154 are dimensioned to accommodate sleeve-locking balls 38, as indicated by FIGS. 7-9.

The numerals 158, 166, 168 and 172 denote grooves in the surface of tubular socket 150 which are generally similar in structure and function to the grooves 40, 50, 51 and 56, respectively, in the surface of tubular socket 20. The numerals 162, 164, 170 and 171 denote stops which are generally similar in structure and function to the stops 43, 46, 60 and 64 of FIG. 10. Ramps, such as the ramps 44, 47, 52 and 58 of FIGS. 11-14, will be provided in the grooves 158, 166, 168 and 172. The numeral 160 denotes a starting-terminating location in the left-hand end of groove 158; and the inner end of the guiding pin 120 will be in that location whenever the locking pin 122 is within the large-diameter portion 156 of recess 154. That starting-terminating location will abruptly halt movement of the guiding pin 120 as that pin is moved into that location; and hence that starting-terminating location will provide a distinct and unmistakable indication that the sleeve 90 has reached the position where the plug 78 can be separated from the tubular socket 150 and where that sleeve will be locked to that socket. In the preferred embodiment of FIGS. 15 and 16, as well as in the preferred embodiment of FIGS. 1-14, the diameter of the guiding pin 120 is three thousandths (0.003) of an inch smaller than the width of each of the grooves 158, 166, 168 and 172.

The locking pin 122 and the locking pin 120 of FIG. 15 are fixed circumferentially relative to each other, as by being held within holes in the sleeve 90 which correspond to the holes 112 and 114 of FIGS. 7-9. Consequently, the locking pin 122 must follow a path which is exactly the same as, although circumferentially spaced from, the path which is followed by the guiding pin 120 whenever the sleeve 90 is moved relative to the tubular socket 150. Also, the locking pin 122 must move into, and be held by, the large-diameter portion 156 of recess 154, whenever the guiding pin 120 is moved to the starting-terminating location 160 at a time when the plug 78 is not within the tubular socket 150. Although it might seem a simple matter to make the large-diameter portion 156 large enough to accommodate the inner end of locking pin 122, whenever the guiding pin 120 is anywhere within the starting-terminating location 160, severe physical and mechanical restraints limit the size of that large-diameter portion. For example, the recess 154 must be close enough to the circumferentially-aligned recesses 152 for the locking balls 68 to enable the annular rib 84 of the plug 78 to hold the locking ball 38 in its outer position when that plug is in its innermost position. Also, the diameter and position of the large-diameter portion 156 must be such that whenever the inner end of the locking pin 122 is within that large-diameter portion—as when the plug 78 is displaced from the tubular socket 150—the guiding pin 120 can not be moved far enough along the start groove 158 to be intercepted and held by the stop 162. In addition, the diameter of the large-diameter portion 156 must be small enough so there is at least fifteen thousandths (0.015) of an inch between that large-diameter portion and the closest recess 152. Moreover, the recess 154 must be close enough to the circumferentially-aligned recesses 152 for the locking balls 68 and must be close enough to one of those circumferentially-aligned recesses so the path of movement for the locking pin 122 can start at the left-hand sides of those circumferentially-aligned recesses, can pass between two of those circumferentially-aligned recesses, can move to the right-hand sides of those circumferentially-aligned recesses, and then again pass between those two circumferentially-aligned recesses. Further, the closed-loop pin-receiving groove must have a readily-sensed starting-terminating location which will accommodate the inner end of guiding pin 120 when the large-diameter portion 156 receives the inner end of locking pin 122. Furthermore, the closed-loop pin-receiving groove must be spaced far enough from adjacent circumferentially-aligned recesses to provide an adequate wall thickness for that groove. It should also be noted that the large-diameter portion 156 must be large enough and so positioned that it can accommodate the inner end of the locking pin 122 whenever the inner end of the guiding pin 120 is in the starting-terminating location—regardless of any and all "play" available to that guiding pin while it is in that location. Further, it should be noted that the major portion of the closed-loop pin-receiving groove should be overlain and protected by the sleeve 90 in all moved positions of that sleeve. In addition, it should be noted that a single annular-type spring should be usable to urge both the guiding pin 120 and the locking pin 122 inwardly toward the surface of the tubular socket 150. Finally, the inner diameter of the tubular socket 150 is even smaller than the outer diameter of that socket—which is less than one and two-tenths (1.2) of an inch.

The configuration, for the closed-loop pin-receiving groove, which is shown by FIG. 15, meets all of the foregoing restraints; and yet it permits standard and usual machining tolerances to be used in the machining of guiding pin 120, of locking pin 122, of recess 154, of its large-diameter portion 156, and of the closed-loop pin-receiving groove.

It will be noted that the groove 172 is alinear, so the last part 176 thereof is angularly-displaced from the initial part thereof adjacent the stop 170. The groove 172 extends from a plug-locked fluid-off position, which is adjacent the junction of grooves 168 and 172 and which is at the right of the center of generation of stop 170, to the plug-unlocked fluid-off starting-terminating location 160; and hence that groove constitutes the return section of the closed loop which is constituted by grooves 158, 166, 168 and 172. The groove 158 constitutes the start section of that closed loop; and it has a plug-locked, fluid-off position in the same axial location as the plug-locked, fluid-off position which is adjacent the junction of grooves 168 and 172 and which is at the right of the center of generation of stop 170.

The numeral 178 denotes the apex of the angle which is subtended by the groove 158 and the last part 176 of the groove 172; and hence denotes the apex of the angle which is subtended by the start section and the last part of the return section of an overall closed-loop, pin-receiving groove. In the preferred embodiment of FIGS. 15 and 16, that subtended angle is a right angle whereas in the preferred embodiment of FIGS. 1-14, the angle subtended by the grooves 40 and 56 is just slightly larger than seventy degrees.

Where the return section of the closed-loop, pin-receiving groove is linear, where the angle subtended between that section and the start section of that pin-receiving groove is less than ninety degrees, as in the embodiment of FIGS. 1-14, and where the guiding pin 120 is held away from the apex of that subtended angle, the distance between that apex and the surface of that guiding pin is larger than the distance between the apex 178 and the surface of pin 120 in FIG. 16. If the return section of a pin-receiving groove was linear, if the angle subtended between the start and return section of that pin-receiving groove was sixty-seven and one-half degrees, and if the guiding pin 120 was held away from the apex of that subtended angle, the distance between that apex and the surface of the guiding pin 120, and hence the amount of "play", would be twice the distance between the apex 178 and the surface of the guiding pin 120. Specifically, where the "play" between apex 178 and the surface of the guiding pin 120 is twenty-five thousandths (0.025) of an inch in FIG. 16, the "play" between the surface of guiding pin 120 and the apex of an angle of sixty-seven and one-half degrees would be fifty thousandths (0.050) of an inch. Although the "play" between the surface of guiding pin 120 and the apex of the angle subtended by grooves 40 and 56 in FIG. 10 will be less than the "play" where the subtended angle is sixty-seven and one-half degrees, the "play" in FIG. 10 will be substantially greater than the "play" in FIG. 16.

The larger "play" which is available whenever the subtended angle is less than ninety degrees requires an increase in the diameter of the large-diameter portion 156 of the recess 154 for the locking pin 122. Where the return section of the pin-receiving groove is alinear and makes the angle between the last part of that section and the start section a right angle, as in FIGS. 15 and 16, the diameter of the portion 156 of the recess 154, for a locking pin 122 which has a diameter of one hundred and twenty-seven thousandths (0.127) of an inch, can be as small as one hundred and sixty-one thousandths (0.161) of an inch. However, if the angle subtended by the start section (groove 158) and the last part 176 of the return section (groove 172) were to be reduced from ninety degrees to sixty-seven and one-half degrees, the diameter of the portion 156 of recess 154 would have to be increased to one hundred and eighty-six thousandths (0.186) of an inch, and the geometric center of that recess would have to be shifted to the right a distance which was equal to the cosine of forty-five degrees multiplied by twenty-five thousandths (0.025) of an inch—to accommodate the additional shifting of guiding pin 120 to the right which is permitted by the twenty-five thousandths (0.025) of an inch increase in "play" which is due to the smaller subtended angle.

The wall thickness between the recess 154 and the closest recess 152 can be forty thousandths (0.040) of an inch where the angle subtended by the start section and the last part of the return section is a right angle. However, if that subtended angle were to be reduced to sixty-seven and one-half degrees, that wall thickness would be reduced to less than twenty thousandths (0.020) of an inch unless the axial distance between the aligned recesses 152 and the plug-locked fluid-off position at the right of the center of generation of stop 170 were to be shifted. A wall thickness of forty thousandths (0.040) of an inch is amply adequate; but a wall thickness of less than twenty thousandths (0.020) of an inch is not desirable.

The change of direction between the initial part and the last part 176 of the groove 172 will not appreciably impede movement of the guiding pin 120 as it moves through that groove from a position to the right of the center of generation of stop 170 to the starting-terminating location 160. This is desirable; because it encourages the user of the quick connect-disconnect coupling of FIGS. 15 and 16 to move that guiding pin fully into that starting-terminating location—and hence to move the locking pin 122 into register with the large-diameter portion 156 of recess 154—as that user prepares to separate the plug 78 from the tubular socket 150. However, even if a user were to separate that plug from that tubular socket while the guiding pin 120 was still in the groove 172, neither that user nor anyone else could, while that plug was displaced from that socket, shift the sleeve 90 relative to that tubular socket in such a way as to cause that sleeve to reach a fluid-on position. Specifically, if that user or anyone else tried to move the guiding pin 120 to the right along the return groove 172 and past the stop 170, that stop would intercept that guiding pin and thereby keep the sleeve 90 from moving to fluid-on position. If that user or anyone else tried to move the guiding pin 120 to and through the starting-termination location 160 and then tried to shift that guiding pin to the right in groove 158—while the plug was displaced from the socket 150—the locking pin 122 would move into register with the large-diameter portion 156 of recess 154 and would be pushed into that recess by the split-ring spring 116. All of this means that the alinear nature of the return groove 172 will not keep a user or anyone else from moving the guiding pin 120 into the starting-terminating location 160—and hence will not keep the locking pin 122 from moving into register with the larger-diameter portion 156 of recess 154. However, even if a user, through inadvertence or deliberate intent, did not move that guiding pin all the way into the starting-terminating location—as the plug 78 was separated from the socket 150—neither that user nor anyone else could shift the sleeve 90 to fluid-on position without first reinserting that plug into the cavity at the right-hand end of that tubular socket.

In contrast to the gentle change of direction between the first and last parts of groove 172, the abrupt changes of direction between the last parts of grooves 51 and 168 and the initial parts of grooves 56 and 172 will affirmatively and abruptly inpede the movement of guiding pin 120 as it passes from those last parts into those first parts. This is desirable; because the affirmative and abrupt impedance of such movement will indicate to the user that the guiding pin 120 has reached the plug-locked, fluid-off position at the right of the center of generation of stop 170. If he wished to do so, the user could safely leave the sleeve 90 in that plug-locked, fluid-off position for any desired lengths of time, as for example during pauses in his work, during a "break", during a lunch period, over night, or even over a week end. When the user subsequently resumed use of the quick connect-disconnect coupling, he could shift the guiding pin 120 back along groove 51 or 168 toward a plug-locked fluid-on position. The feature of permitting a user to shift the sleeve 90 between plug-locked fluid-on and plug-locked fluid-off positions while the guiding pin 120 is within the groove 51 or 168 is a desirable feature; because it saves the user the time involved in rotating and axially shifting that sleeve to cause that guiding pin to move successively through return groove 56 or 172, through start groove 40 or 158, and then through groove 50 or 166 to a plug-locked fluid-on position in groove 51 or 168.

The "play" between the apex 178 and the surface of guiding pin 120 is very small when the subtended angle between the initial part of groove 158 and the last part of groove 172 is a right angle; and hence it is desirable to provide such a subtended angle. However, the "play" between that apex and the surface of guiding pin 120 will remain within acceptable limits—even where the machining tolerances are not held very close—if the subtended angle is between eighty and ninety degrees.

The last part 176 of the groove 172 is straight, and the initial part of that groove also is straight, as shown by FIG. 15. If desired, the last part 176 and all or part of the rest of groove 172 could be made arcuate, so there was no perceptible change-direction point intermediate the ends of that groove. The important feature of the last part of groove 172 is that it limit to an acceptable amount the "play" between the face of guide pin 120 and the apex of the angle subtended by that last part and the initial part of the start portion of the closed-loop, pin-receiving groove.

In the embodiments of FIGS. 1-14 and of FIGS. 15 and 16, five recesses for locking balls are provided; and each of those recesses has the center thereof spaced from the center of at least one adjacent locking ball recess by sixty (60) degrees. Such an arrangement is very useful. However, if desired, the locking ball recess which is closest to the recess 36 or to the recess 154 could be shifted so its center was spaced more than sixty (60) degrees from the center of the locking ball recess which is next-closest to recess 36 or 154. That shifting would provide a desirably-large wall thickness between the shifted recess and recess 36 or 154; but it would eliminate the desirable equal center-to-center spacing for the locking ball recesses. Even if such shifting were to be provided, it would be desirable to use the alinear configuration for the return section 172, and the angular relation between that return section and the start section 158, which are shown by FIG. 15.

Whereas the drawing and accompanying description have shown and described a preferred embodiment of the present invention, it should be apparent to those skilled in the art that various changes may be made in the form of the invention without affecting the scope thereof.

What I claim is:

1. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position.

2. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a plurality of stops, and said pin being movable past said stops in said progressive but not necessarily continuous direction of movement but said stops preventing accidental movement of said pin past them in said return direction of movement.

3. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a groove which has walls and which accommodates a portion of said pin, said walls of said groove confining said pin for movement parallel to the axis of said groove, and said groove having a plurality of stops therein, said pin being movable past said stops in said progressive but not necessarily continuous direction of movement but said stops preventing accidental movement of said pin past them in said return direction of movement.

4. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including two stops that define said first and said further predetermined plug-locked positions, one of said stops preventing accidental relative movement of said sleeve and said female member in said return direction of movement between said further predetermined plug-locked position and said first predetermined plug-locked position, and another of said stops preventing accidental relative movement of said sleeve and said female member in said return direction of movement between said first predetermined plug-locked position and said plug-unlocked position.

5. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a groove which has walls and which accommodates a portion of said pin, said pin remaining within said groove during relative movement of said sleeve and said female member in said progressive but not necessarily continuous direction of movement between said plug-unlocked position and said first said predetermined plug-locked position, said pin remaining within said groove during relative movement of said sleeve and said female member in said progressive but not necessarily continuous direction of movement between said first said predetermined plug-locked position and said further predetermined plug-locked position, and said groove having changes of surface at the bottom thereof, said pin being movable past said changes of surface in said progressive but not necessarily continuous direction of movement, said changes of surface preventing accidental movement of said pin past them in said return direction of movement.

6. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a closed loop that has walls and that guides and confines said pin, one portion of said closed loop requiring said limited relative movement of said sleeve and said female member in said progressive but not necessarily continuous direction of movement in said predetermined sequence from said plug-unlocked position to said first said predetermined plug-locked position and then to said further predetermined plug-locked position whenever said relative movement is to be from said plug-unlocked position to and through said two predetermined plug-locked positions and then back to said plug-unlocked position and also preventing said accidental relative movement of said sleeve and said female member in said return direction of movement between said further predetermined plug-locked position and either said plug-unlocked position or said first said predetermined plug-locked position, and another portion of said closed loop requiring relative movement of said sleeve and said female member in the nature of a bypassing movement from said further predetermined plug-locked position to said plug-unlocked position without passing through said first said predetermined plug-locked position.

7. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a closed loop that has walls and that guides and confines said pin, one portion of said closed loop requiring said limited relative movement of said sleeve and said female member in said progressive but not necessarily continuous direction of movement in said predetermined sequence from said plug-unlocked position to said first said predetermined plug-locked position and then to said further predetermined plug-locked position whenever said relative movement is to be from said plug-unlocked position to and through said two predetermined plug-locked positions and then back to said plug-unlocked position and also preventing said accidental relative movement of said sleeve and said female member in said return direction of movement between said further predetermined plug-locked position and either said plug-unlocked position or said first said predetermined plug-locked position, another portion of said closed loop requiring relative movement of said sleeve and said female member in the nature of a by-passing movement from said further predetermined plug-locked position to said plug-unlocked position without passing through said first said predetermined plug-locked position, and said interacting means preventing accidental relative movement of said sleeve and said female member in said return direction of movement from said plug-unlocked position to said further predetermined plug-locked position via said other portion of said closed loop.

8. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a closed loop that has walls and that guides and confines said pin, one portion of said closed loop requiring said limited relative movement of said sleeve and said female member in said progressive but not necessarily continuous direction of movement in said predetermined sequence from said plug-unlocked position to said first said predetermined plug-locked position and then to said further predetermined plug-locked position whenever said relative movement is to be from said plug-unlocked position to and through said two predetermined plug-locked positions and then back to said plug-unlocked position and also preventing said accidental relative movement of said sleeve and said female member in said return direction of movement between said further predetermined plug-locked position and either said plug-unlocked position or said first said predetermined plug-locked position, another portion of said closed loop requiring relative movement of said sleeve and said female member from said further predetermined plug-locked position to said plug-unlocked position in the nature of a by-passing movement without passing through said first said predetermined plug-locked position, and said closed loop having a plurality of straight sections which are angularly displaced from each other.

9. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said interacting means including a pin and a closed loop that has walls and that guides and confines said pin, one portion of said closed loop requiring said limited relative movement of said sleeve and said female member in said progressive but not necessarily continuous direction of movement in said predetermined sequence from said plug-unlocked position to said first said predetermined plug-locked position and then to said further predetermined plug-locked position whenever said relative movement is to be from said plug-unlocked position to and through said two predetermined plug-locked positions and then back to said plug-unlocked position and also preventing said accidental relative movement of said sleeve and said female member in said return direction of movement between said further predetermined plug-locked position and either said plug-unlocked position or said first said predetermined plug-locked position, another portion of said closed loop requiring relative movement of said sleeve and said female member in the nature of a bypassing movement from said further predetermined plug-locked position to said plug-unlocked position without passing through said first said predetermined plug-locked position, and said relative movement including translating movement and rotating movement.

10. A connect-disconnect coupling as claimed in claim 1 wherein said interacting means include a pin and a plurality of stops, wherein said pin is movable past said stops in said progressive but not necessarily continuous direction of movement but said stops prevent accidental movement of said pin past them in said return direction of movement, and wherein said pin and said stops are formed to provide surface contact rather than mere line contact therebetween.

11. A connect-disconnect coupling as claimed in claim 1 wherein said interacting means include a pin that is supported by and that is movable with and movable relative to said sleeve and also include a surface on said female member which has walls and which receives said pin.

12. A connect-disconnect coupling as claimed in claim 1 wherein said female member is connectable to a first fluid line, wherein said plug is connectable to a second fluid line, wherein said sleeve and said plug coact to define a fluid passage and thereby permit fluid to flow between said fluid lines whenever said sleeve is in one of said plug-locked positions, and wherein said sleeve and said plug coact to interrupt said fluid passage and thereby keep fluid from flowing between said fluid lines whenever said sleeve is in another of said plug-locked positions.

13. A connect-disconnect coupling as claimed in claim 1 wherein said interacting means include walls and an abutment guided by said walls, wherein one of said interacting means is at the inner surface of said sleeve, and wherein another of said interacting means is at the outer surface of said female member.

14. A connect-disconnect coupling as claimed in claim 1 wherein said interacting means include a pin and a closed loop that has walls and that guides and confines said pin, and wherein said pin and said closed loop require rotating as well as translating relative movement of said sleeve and of said female member to return said sleeve in said return direction of movement from said further predetermined plug-locked position to said plug-unlocked position.

15. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

16. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said detent thereafter returning to said predetermined position relative to said motion-limiting stop so engagement of said detent with said motion-limiting stop will prevent accidental relative return movement of said sleeve and said female member along said predetermined path, said interacting means requiring limited relative movement along a second predetermined path from said plug-locked fluid-on position to said plug-unlocked fluid-off position, said second predetermined path being different from the first said predetermined path, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

17. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said interacting means requiring limited relative movement along a second predetermined path from said plug-locked fluid-on position to said plug-unlocked fluid-off position, said second predetermined path being different from the first said predetermined path, said detent of said interacting means being a pin, and said interacting means including a closed loop that has walls and that guides and confines said pin, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

18. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said motion-limiting stop being on said female member and being interposed between said plug-unlocked fluid-off position and said plug-locked fluid-on position, said detent being movable past said motion-limiting stop in said predetermined but not necessarily continuous direction of movement as said sleeve is moved from said plug-unlocked fluid-off position to said plug-locked fluid-on position but said motion-limiting stop preventing return movement of said detent past it in the event an attempt were to be made to cause return movement of said sleeve from said plug-locked fluid-on position to said plug-unlocked fluid-off position, and said interacting means also including a further motion-limiting stop which is on said female member and is interposed between said plug-locked fluid-on position and said plug-unlocked fluid-off position, said detent being movable past said further motion-limiting stop in said predetermined but not necessarily continuous direction but said further motion-limiting stop preventing return movement of said detent past it from said plug-unlocked fluid-off position to said plug-locked fluid-on position, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

19. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said motion-limiting stop being interposed between said plug-unlocked fluid-off position and said plug-locked fluid-on position, said detent being movable past said motion-limiting stop in said predetermined but not necessarily continuous direction of movement when said detent is out of said predetermined position relative to said motion-limiting stop but said motion-limiting stop preventing relative return movement of said detent past it when said detent is in said predetermined position relative to said motion-limiting stop, said interacting means also including a further motion-limiting stop which is interposed between said plug-locked fluid-on position and said plug-unlocked fluid-off position, said detent being movable past said further motion-limiting stop in said predetermined but not necessarily continuous direction but said further motion-limiting stop preventing relative return movement of said detent past it from said plug-unlocked fluid-off position to said plug-locked fluid-on position, the first said motion-limiting stop being in one arm of a closed loop that has walls, and said further motion-limiting stop being in a second arm of said closed loop, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

20. A connect-disconnect coupling as claimed in claim 15 wherein a plug-locked fluid-off position is interposed between said plug-unlocked fluid-off position and said plug-locked fluid-on position, wherein said detent and said motion-limiting stop automatically respond to force, which tends to provide relative movement between said sleeve and said female member in said predetermined but not necessarily continuous direction of movement along said predetermined path, to dispose said detent out of said predetermined position relative to said motion-limiting stop and thereby allow said relative movement between said sleeve and said female member to occur in said predetermined but not necessarily continuous direction of movement along said predetermined path, and wherein said detent thereafter automatically returns to said predetermined position relative to said motion-limiting stop.

21. A connect-disconnect coupling as claimed in claim 15 wherein a plug-locked fluid-off position is interposed between said plug-unlocked fluid-off position and said plug-locked fluid-on position, wherein said detent and said motion-limiting stop automatically respond to force, which tends to provide relative movement between said sleeve and said female member in said predetermined but not necessarily continuous direction of movement along said predetermined path, to dispose said detent out of said predetermined position relative to said motion-limiting stop and thereby allow said relative movement between said sleeve and said female member to occur in said predetermined but not necessarily continuous direction of movement along said predetermined path, wherein said detent thereafter automatically returns to said predetermined position relative to said motion-limiting stop, and wherein a second motion-limiting stop permits movement of said detent past it in said predetermined but not necessarily continuous direction of movement along said predetermined path, but can prevent accidental movement of said detent past it in the return direction of movement, and wherein said detent must move past the first said motion-limiting stop in said predetermined but not necessarily continuous direction before it can reach said second motion-limiting stop.

22. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member along a predetermined but not necessarily continuous path between a plug-unlocked position and a plug-locked position to cause said locking means on said female member to coact with said complementary locking means on said plug to lock said plug in position within said one end of said female member, said interacting means preventing accidental relative return movement of said sleeve and said female member along said predetermined path, said female member having the axis thereof generally aligned with the axis of said plug and said female member being movable generally parallel to its axis and also generally parallel to said axis of said plug as said one end of said female member is telescoped over said plug, said predetermined path having the portion thereof, which extends from said plug-locked position to said plug-unlocked position, generally aligned with said axis of said female member, and further interacting means on said sleeve and on said female member which prevent relative movement of said sleeve and said female member whenever said plug is spaced away from said female member but which respond to the telescoping of said one end of said female member over said plug to permit relative movement of said sleeve and said female member along said portion of said predetermined path and hence in a direction generally parallel to said axis of said female member, whereby said sleeve moves generally parallel to said axis of said female member as said sleeve and said female member move together during the telescoping of said one end of said female member over said plug and said sleeve also moves generally parallel to said axis of said female member during the relative movement of said sleeve and said female member along said portion of said predetermined path.

23. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a predetermined but not necessarily continuous direction of movement along a predetermined path between a plug-unlocked position and a plug-locked position to cause said locking means on said female member to coact with said complementary locking means on said plug to lock said plug in position within said one end of said female member, said interacting means requiring relative movement to occur in said predetermined but not necessarily continuous direction of movement along said predetermined path whenever said relative movement is to be from said plug-unlocked position to said plug-locked position and preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, second interacting means on said sleeve and on said female member which prevent relative movement of said sleeve and said female member whenever said plug is spaced away from said female member, said second interacting means including a second detent and an abutment which coact to prevent relative movement between said sleeve and said female member whenever said plug is spaced away from said female member, said locking means on said female member including a plurality of locking balls that are mounted within openings in said female member, said complementary locking means on said plug including a circumferentially-extending groove at the outer surface of said plug which can accommodate the inner portions of said locking balls, and a circumferentially-extending groove at the inner surface of said sleeve which can accommodate the outer portions of said locking balls, said groove in said inner surface of said sleeve having walls which are spaced inwardly from said one end of said female member, one of said walls of said groove in said inner surface of said sleeve being engageable with said outer portions of said locking balls to force said inner portions of said locking balls inwardly into said groove in said outer surface of said plug to enable said inner portions of said locking balls to lock said female member and said plug member against separation, another wall of said groove in said inner surface of said sleeve closely encircling said female member, said groove in said outer surface of said plug having walls, one of said walls of said groove in said outer surface of said plug being engageable with said inner portions of said locking balls to force said inner portions of said locking balls outwardly of said groove in said outer surface of said plug to free said plug for movement relative to said female member, the insertion of said plug into said female member freeing said second detent and said abutment for relative movement, said second detent and said abutment being movable relative to each other during said limited relative movement of said sleeve and said female member under the restraint provided by the first said interacting means, and said first said interacting means guiding said second detent and said abutment into register with each other as said first said interacting means guide said sleeve and said female member toward said plug-unlocked position.

24. A connect-disconnect coupling as claimed in claim 1, wherein said interacting means include a stop and a pin, and wherein said pin must move out of said plug-unlocked position past said stop and thereby be restrained from accidental movement in said return direction of movement to said plug-unlocked position before said locking means can lock said plug within said female member.

25. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said locking means on said female member and said complementary locking means on said plug releasably locking said plug within said female member before said female member and said sleeve reach said plug-locked fluid-on position during said relative movement in said predetermined but not necessarily continuous direction of movement, and said locking means on said female member and said complementary locking means on said plug and said sleeve coacting to lock said plug within said female member as long as said sleeve and said female member are in said plug-locked fluid-on position, whereby said female member and said sleeve must be moved out of said plug-locked fluid-on position before said locking means can release said plug from said female member, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

26. The method of interconnecting two lines for pressurized fluid flow which comprises:
   selecting a fluid line which has a female member that is fixedly attached thereto and that has a sleeve member thereon which has a locking means that holds said sleeve member in an initial position whenever said two lines are not interconnected and which is set in one position relative to said female member to provide a passage for fluid and thereby permit pressurized fluid flow and which is set in a second position relative to said female member to interrupt said passage for fluid and thereby prevent pressurized fluid flow,
   selecting a fluid line which has a tubular plug that is fixedly attached thereto and that has one end thereof dimensioned to telescope within one end of said female member to provide a fluid-tight passage between said fluid lines,
   inserting said plug into said one end of said female member to release said locking means that holds said sleeve member fixed relative to said female member in said initial position whenever said plug is spaced away from said female member to keep said two lines from being interconnected, moving said sleeve member relative to said female member, while holding said plug within said one end of said female member, until said sleeve member has moved into a position relative to said female member where it causes a further locking means to lock said plug within said one of said female member, moving said sleeve member relative to said female member along a given path of movement in a predetermined but not necessarily continuous direction to apply a force to a detent that is carried by one of said members to cause said detent to move out of the path of a motion-limiting stop in the other of said members so said sleeve member can reach a fluid-on position and thereby provide a fluid path which will permit pressurized fluid flow between said lines via said female member and said plug, moving said sleeve member far enough relative to said female member in said predetermined but not necessarily continuous direction along said given path of movement to permit said detent to move into a position wherein it could engage said motion-limiting stop and thereby limit movement of said sleeve member in the return direction along said given path of movement, subsequently moving said sleeve member relative to said female member along a second path of movement which is different from said given path of movement to enable said sleeve member to reach a fluid-off position and thereby interrupt said fluid path to prevent pressurized fluid flow between said lines via said female member and said plug, thereafter moving said sleeve member relative to said female member to a position wherein it causes said further locking means to permit said plug to be moved away from said female member, and finally moving said plug away from said female member.

27. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said interacting means responding to relative rotation and translation of said sleeve and said female member along a second predetermined path, which is different from the first said predetermined path, to permit limited relative movement of said sleeve and said female member from said plug-locked fluid-on position to said plug-unlocked fluid-off position, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position.

28. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which require relative movement of said sleeve and said female member in a progressive but not necessarily continuous direction of movement between said plug-unlocked position and at least one of two predetermined plug-locked positions to cause said locking means on said female member to coact with said complementary locking means on said plug to lock said plug in position within said one end of said female member, said interacting means requiring relative movement in said progressive but not necessarily continuous direction of movement to occur in a predetermined sequence from said plug-unlocked position to a first predetermined plug-locked position and then to a further predetermined plug-locked position whenever said relative movement is to be from said plug-unlocked position to and through said two predetermined plug-locked positions and then back to said plug-unlocked position, said interacting means preventing accidental relative movement of said sleeve and said female member in the return direction of movement between said further predetermined plug-locked position and either said plug-unlocked position or said first predetermined plug-locked position, said locking means on said female member and said complementary locking means on said plug selectively locking said plug to, or freeing said plug for movement away from, said female member, said locking means on said female member and said complementary locking means on said plug locking said plug to said female member during said relative movement of said sleeve and of said female member in said progressive but not necessarily continuous direction of movement from said plug-unlocked position to said first predetermined plug-locked position, said interacting means permitting limited relative movement of said sleeve and said female member from said further predetermined plug-locked position to said plug-unlocked position, and said locking means on said female member and said complementary locking means on said plug freeing said plug for movement away from said female member during said relative movement of said sleeve and of said female member from said further predetermined plug-locked position to said plug-unlocked position.

29. A connect-disconnect coupling as claimed in claim 1 wherein said locking means on said female member and said complementary locking means on said plug selectively lock said plug to, or free said plug for movement away from, said female member, wherein said locking means on said female member and said complementary locking means on said plug lock said plug to said female member during said relative movement of said sleeve and of said female member in said progressive but not necessarily continuous direction of movement from said plug-unlocked position to said first predetermined plug-locked position, wherein said interacting means permit limited relative movement of said sleeve and said female member from said further predetermined plug-locked position to said plug-unlocked position, wherein said locking means on said female member and said complementary locking means on said plug free said plug for movement away from said female member during said relative movement of said sleeve and of said female member from said further predetermined plug-locked position to said plug-unlocked position, and wherein said locking means on said female member and said complementary locking means on said plug include a groove with walls and a plurality of balls that are selectively extendable into said groove to be confined by said walls.

30. A connect-disconnect coupling as claimed in claim 1 wherein said locking means on said female member and said complementary locking means on said plug selectively lock said plug to, or free said plug for movement away from, said female member, wherein said locking means on said female member and said complementary locking means on said plug lock said plug to said female member during said relative movement of said sleeve and of said female member in said progressive but not necessarily continuous direction of movement from said plug-unlocked position to said first predetermined plug-locked position, wherein said interacting means permit limited relative movement of said sleeve and said female member from said further predetermined plug-locked position to said plug-unlocked position, wherein said locking means on said female member and said complementary locking means on said plug free said plug for movement away from said female member during said relative movement of said sleeve and of said female member from said further predetermined plug-locked position to said plug-unlocked position, and wherein said locking means on said female member and said complementary locking means on said plug include a groove in said plug which has walls and a plurality of balls that are carried by said female member and that are selectively extendable into said groove to be confined by said walls, and wherein said sleeve can force said plurality of balls to extend into said groove.

31. A connect-disconnect coupling for fluid which comprises a tubular female member, a sleeve which encircles said female member, said female member and said sleeve being relatively movable, a tubular plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which require relative movement of said sleeve and said female member in a predetermined but not necessarily continuous direction of movement between a plug-unlocked fluid-off position and a plug-locked fluid-on position whenever said relative movement is to be from said plug-unlocked fluid-off position to said plug-locked fluid-on position, said interacting means requiring said limited relative movement to occur in said predetermined but not necessarily continuous direction of movement along a predetermined path while preventing accidental relative return movement of said sleeve and said female member along said predetermined path, said interacting means including at least one motion-limiting stop and a detent that is movable into a predetermined position relative to said motion-limiting stop to be able to engage said motion-limiting stop to prevent accidental relative return movement of said sleeve and said female member along said predetermined path, said detent being disposable out of said predetermined position relative to said motion-limiting stop to provide said relative movement between said sleeve and said female member in said predetermined but not necessarily continuous direction of movement along said predetermined path, said detent thereafter returning to said predetermined position relative to said motion-limiting stop so engagement of said detent with said motion-limiting stop will prevent accidental relative return movement of said sleeve and said female member along said predetermined path, said locking means on said female member and said complementary locking means on said plug selectively locking said plug to, or freeing said plug for movement away from, said female member, said locking means on said female member and said complementary locking means on said plug locking said plug to said female member during said relative movement of said sleeve and of said female member in said predetermined but not necessarily continuous direction from said plug-unlocked fluid-off position to said plug-locked fluid-on position, said interacting means permitting limited relative movement of said sleeve and said female member from said plug-locked fluid-on position to said plug-unlocked fluid-off position, and said locking means on said female member and said complementary locking means on said plug freeing said plug for movement away from said female member during said relative movement of said sleeve and of said female member from said plug-locked fluid-on position to said plug-unlocked fluid-off position, said sleeve and said plug coacting to provide a fluid passage and thereby permit fluid to flow through said female member and said plug whenever said sleeve and said female member are in said further predetermined plug-locked position, said sleeve and said plug coacting to interrupt said fluid passage and thereby keep fluid from flowing through said female member and said plug whenever said sleeve and said female member are in said plug-unlocked position.

32. A connect-disconnect coupling as claimed in claim 15 wherein said locking means on said female member and said complementary locking means on said plug selectively lock said plug to, or free said plug for movement away from, said female member, wherein said locking means on said female member and said complementary locking means on said plug lock said plug to said female member during said relative movement of said sleeve and of said female member in said predetermined but not necessarily continuous direction from said plug-unlocked fluid-off position to said plug-locked fluid-on position, wherein said interacting means permit limited relative movement of said sleeve and said female member from said plug-locked fluid-on position to said plug-unlocked fluid-off position, wherein said locking means on said female member and said complementary locking means on said plug free said plug for movement away from said female member during said relative movement of said sleeve and of said female member from said plug-locked fluid-on position to said plug-unlocked fluid-off position, and wherein said locking means on said female member and said complementary locking means on said plug include a groove with walls and a plurality of balls that are selectively extendable into said groove to be confined by said walls.

33. A connect-disconnect coupling as claimed in claim 15 wherein said locking means on said female member and said complementary locking means on said plug selectively lock said plug to, or free said plug for movement away from, said female member, wherein said locking means on said female member and said complementary locking means on said plug lock said plug to said female member during said relative movement of said sleeve and of said female member in said predetermined but not necessarily continuous direction from said plug-unlocked fluid-off position to said plug-locked fluid-on position, wherein said interacting means permit limited relative movement of said sleeve and said female member from said plug-locked fluid-on position to said plug-unlocked fluid-off position, wherein said locking means on said female member and said complementary locking means on said plug free said plug for movement away from said female member during said relative movement of said sleeve and of said female member from said plug-locked fluid-on position to said plug-unlocked fluid-off position, wherein said locking means on said female member and said complementary locking means on said plug include a groove with walls and a plurality of balls that are carried by said female member and that are selectively extendable into said groove to be confined by said walls, and wherein said sleeve can force said plurality of balls to extend into said groove to be confined by said walls.

34. A connect-disconnect coupling for fluid which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, and interacting means on said sleeve and on said female member which define a predetermined path between a plug-unlocked fluid-off position and a plug-locked fluid-on position and then back to said plug-unlocked fluid-off position and which require relative movement of said sleeve and said female member along said predetermined path whenever said relative movement is to be from said plug-unlocked fluid-off position to said plug-locked fluid-on position and then back to said plug-unlocked fluid-off position, said sleeve and said plug coacting to provide a fluid passage and thereby permit fluid to flow through said female member and said plug whenever said sleeve and said female member are in said plug-locked fluid-on position, said sleeve and said plug coacting to interrupt said fluid passage and thereby keep fluid from flowing through said female member and said plug whenever said sleeve and said female member are in said plug-unlocked fluid-off position, said predetermined path having a first portion thereof extending between said plug-unlocked fluid-off position and said plug-locked fluid-on position, said predetermined path having a second portion thereof which is, at least in part, spaced from said first portion of said predetermined path and which guides said limited relative movement of said sleeve and said female member away from said first portion of said predetermined path, said sleeve and said female member being movable along said first portion of said predetermined path during limited relative movement of said sleeve and said female member from said plug-unlocked fluid-off position to said plug-locked fluid-on position, said sleeve and said female member being movable along said second portion of said predetermined path during limited relative movement of said sleeve and said female member from said plug-locked fluid-on position to said plug-unlocked fluid-off position, said second portion of said predetermined path having a section which enforces relative circumferential movement between said sleeve and said female member in one direction during limited relative movement of said sleeve and said female member along said second portion of said predetermined path, said second portion of said predetermined path having another section which enforces relative circumferential movement between said sleeve and said female member in the opposite direction during limited relative movement of said sleeve and said female member along said second portion of said predetermined path, said second portion of said predetermined path extending from said plug-locked fluid-on position to said plug-unlocked fluid-off position, whereby said second portion of said predetermined path forces relative circumferential movement of said sleeve and of said female member in said one direction and in said opposite direction during limited relative movement of said sleeve and said female member between said plug-locked fluid-on position and said plug-unlocked fluid-off position.

35. A connect-disconnect coupling which comprises a female member, a sleeve which encircles said female member, said female member and said sleeve being relatively movable, a plug which is dimensioned to telescope into one end of said female member, locking means on said female member and complementary locking means on said plug that selectively respond to telescoping movement of said plug into said one end of said female member and to relative movement of said sleeve and female member into plug-locking position to lock said plug in position within said one end of said female member and that respond to relative movement of said sleeve and female member to plug-unlocked position to release said plug for movement away from said female member, interacting means on said sleeve and on said female member which define a predetermined path between a plug-unlocked position and a plug-locked position and which require relative movement of said sleeve and said female member along said predetermined path between said plug-unlocked position and said plug-locked position whenever said relative movement is to be from said plug-unlocked position to said plug-locked position, said interacting means including a groove in said female member with walls and a detent that extends into said groove and is guided by said walls to guide said limited relative movement of said sleeve and said female member along said predetermined path, second interacting means on said sleeve and on said female member which prevent relative movement of said sleeve and said female member whenever said plug is spaced away from said female member, said second interacting means including a second detent and an abutment which coact to prevent relative movement between said sleeve and said female member whenever said plug is spaced away from said female member, and a split-ring spring that encircles said sleeve and urges said detents inwardly relative to said sleeve, a positioning element that is interposed between the ends of said split-ring spring and prevents appreciable circumferential movement of said split-ring spring relative to said sleeve, said locking means on said female member and said complementary locking means on said plug including a plurality of locking balls that are mounted within openings in said female member and a circumferentially-extending groove at the outer surface of said plug which can accommodate the inner portions of said locking balls, said sleeve being engageable with the outer portions of said locking balls to force said inner portions of said locking balls inwardly into said groove in said outer surface of said plug to enable said inner portions of said locking balls to lock said female member and said plug member against separation, said groove in said outer surface of said plug having walls, one of said walls of said groove in said outer surface of said plug being engageable with said inner portions of said locking balls to force said inner portions of said locking balls outwardly of said groove in said outer surface of said plug to free said plug for movement relative to said female member, the insertion of said plug into said female member freeing said second detent and said abutment for relative movement, said second detent and said abutment being movable relative to each other during said limited relative movement of said sleeve and said female member under the restraint provided by the first said interacting means, and said first said interacting means guiding said second detent and said abutment into register with each other as said first said interacting means guide said sleeve and said female member toward said plug-unlocked position.

36. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location.

37. A connect-disconnect coupling as claimed in claim 36 wherein said path has a start section and a return section, adjacent said plug-unlocked fluid-off starting-terminating location, which coact to subtend an angle with an apex that constitutes one limit to said permitted but limited movement of said sleeve relative to said female member while said sleeve and said female member are in said plug-unlocked fluid-off starting-terminating location.

38. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, which coact to subtend an angle with an apex that constitutes one limit to said permitted but limited movement of said sleeve relative to said female member while said sleeve and said female member are in said plug-unlocked fluid-off starting-terminating location, said return section extending from a location, where said plug is locked within said one end of said female member but said sleeve is movable relative to said female member, to said starting-terminating location, said return section being alinear.

39. A connect-disconnect coupling as claimed in claim 36 wherein said path has a start section and a return section, adjacent said plug-unlocked fluid-off starting-terminating location, which coact to subtend an angle with an apex that constitutes one limit to said permitted but limited movement of said sleeve relative to said female member while said sleeve and said female member are in said plug-unlocked fluid-off starting-terminating location, and wherein said angle subtended by said start section and said return section is larger than seventy degrees.

40. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said plug-locking means on said female member including circumferentially-spaced recesses and plug-locking balls therein, said complementary sleeve-locking means on said sleeve including a sleeve-locking member and said sleeve-locking means on said female member including a recess to accommodate said sleeve-locking member, said recess for said sleeve-locking member being displaced from the closest of said recesses for plug-locking balls by at least fifteen thousandths (0.015) of a inch.

41. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, which coact to subtend an angle with an apex that constitutes one limit to said permitted but limited movement of said sleeve relative to said female member while said sleeve and said female member are in said plug-unlocked fluid-off starting-terminating location, said return section extending from a location, where said plug is locked within said one end of said female member but said sleeve is movable relative to said female member, to said starting-terminating location, said return section being alinear, said plug-locking means on said female member including circumferentially-spaced recesses and plug-locking balls therein, said complementary sleeve-locking means on said sleeve including a sleeve-locking member and said sleeve-locking means on said female member including a recess to accommodate said sleeve-locking member, said recess for said sleeve-locking member being displaced from the closest of said recesses for plug-locking balls by at least fifteen thousandths (0.015) of an inch.

42. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, said return section extending from a location, where said plug is locked within said one end of said female member but said sleeve is movable relative to said female member, to said plug-unlocked, fluid-off starting-terminating location, said return section being alinear.

43. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, said path having at least one abrupt change of direction therein between said plug-locked fluid-on position and a further plug-unlocked fluid-off position which is displaced from said plug-unlocked fluid-off starting-terminating location, said return section extending from said further fluid-off plug-locked position to said plug-unlocked fluid-off starting-terminating location, said return section being alinear but being free of abrupt changes of direction.

44. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, said plug-unlocked fluid-off starting-terminating location requiring an abrupt change of direction of movement between said sleeve and said female member whenever relative movement between said sleeve and said female member is along said return section to said plug-unlocked fluid-off starting-terminating location and then along said start section, said path having at least one abrupt change of direction therein between said plug-locked fluid-on position and a further plug-unlocked fluid-off position which is displaced from said plug-unlocked fluid-off starting-terminating location, said return section extending from said further fluid-off plug-locked position to said plug-unlocked fluid-off starting-terminating location, said return section being alinear.

45. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said interacting means on said sleeve and on said female member including a guiding element, said complementary sleeve-locking means on said sleeve including a locking element which is circumferentially-spaced from said guiding element, said plug-locking means on said female member including a plurality of circumferentially-spaced locking balls, said guiding element and said locking element being at one side of said locking balls whenever said sleeve and said female member are in said plug-unlocked fluid-off starting-terminating location, said guiding element and said locking element being at the opposite side of said locking balls whenever said sleeve and said female member are in said plug-locked fluid-on position, said guiding element moving between two circumferentially-spaced confronting faces of locking balls as it moves from said one side of said locking balls to said opposite side of said locking balls and back, said locking element moving between two different circumferentially-spaced confronting faces of locking balls as it moves from said one side of said locking balls to said opposite side of said locking balls and back.

46. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, said path having at least two portions thereof which are circumferentially-spaced, one of said circumferentially-spaced portions being intermediate said plug-unlocked fluid-off starting-terminating location and said plug-locked fluid-on position and being reached by relative movement between said sleeve and said female member along said start section, the other of said circumferentially-spaced portions being intermediate said plug-locked fluid-on portion and said plug-unlocked fluid-off starting-terminating location and guiding said relative movement between said sleeve and said female member toward said return section.

47. A connect-disconnect coupling which comprises a female member, a sleeve which encircles said female member, said female member and said sleeve being relatively movable, a plug which is dimensioned to telescope into one end of said female member, said female member and said sleeve and said plug coacting to provide a fluid passage and thereby permit fluid to flow through said female member and said plug whenever said sleeve and said female member are in a plug-locked fluid-on position, said sleeve and said female member coacting to interrupt said fluid passage and thereby keep fluid from flowing through said female member and said plug whenever said sleeve and said female member are in a plug-unlocked fluid-off starting-terminating location, plug-locking means on said female member and complementary plug-locking means on said plug that selectively respond to telescoping movement of said plug into said one end of said female member and to relative movement of said sleeve and female member into said plug-locked fluid-on position to lock said plug in position within said one end of said female member and that respond to relative movement of said sleeve and female member to said plug-unlocked fluid-off starting-terminating location to release said plug for movement away from said female member, interacting means on said sleeve and on said female member which require relative movement of said sleeve and said female member in a progressive but not necessarily continuous direction of movement along a path from said plug-unlocked fluid-off starting-terminating location to said plug-locked fluid-on position and then back to said plug-unlocked fluid-off starting-terminating location whenever said plug is to be inserted into, locked within and then released from said one end of said female member, said interacting means on said sleeve and on said female member having configurations and dimensions which permit, but limit, relative movement between said sleeve and said female member while said sleeve and said female member are in said plug-unlocked fluid-off starting-terminating location, and sleeve-locking means on said female member and complementary sleeve-locking means on said sleeve that are adapted to lock said sleeve and said female member against movement to said plug-locked fluid-on position whenever said sleeve and said female member are in said plug-unlocked fluid-off starting-terminating location and said plug is displaced from said female member, said sleeve-locking means on said female member and said complementary sleeve-locking means on said sleeve being dimensioned so they will, despite said permitted but limited relative movement of said sleeve and said female member in said plug-unlocked fluid-off starting-terminating location, lock said sleeve and said female member against movement to said plug-locked fluid-on position if said plug is displaced from said female member as said interacting means on said sleeve and on said female member guide said sleeve and said female member into said plug-unlocked fluid-off starting-terminating location, said path having a start section and a return section, adjacent said plug-unlocked fluid-off starting-terminating location, said return section being generally normal to said start section, said plug-unlocked fluid-off starting-terminating location requiring an abrupt change of direction of movement between said sleeve and said female member whenever relative movement between said sleeve and said female member is along said return section to said plug-unlocked fluid-off starting-terminating location and then along said start section, said path having at least one abrupt change of direction therein between said plug-locked fluid-on position and a further plug-unlocked fluid-off position which is displaced from said plug-unlocked fluid-off starting-terminating location, said return section extending from said further fluid-off plug-locked position to said plug-unlocked fluid-off starting-terminating location, said return section being alinear.

* * * * *